US009199239B2

(12) United States Patent
Liu et al.

(10) Patent No.: US 9,199,239 B2
(45) Date of Patent: Dec. 1, 2015

(54) FLUID SENSORS AND RELATED DETECTORS AND METHODS

(75) Inventors: Ben H. Liu, Raleigh, NC (US); Jeffrey R. SooHoo, Raleigh, NC (US); Meghan E. Vidt, Winston-Salem, NC (US)

(73) Assignee: Ben Liu, Raleigh, NC (US)

(*) Notice: Subject to any disclaimer, the term of this patent is extended or adjusted under 35 U.S.C. 154(b) by 283 days.

(21) Appl. No.: 13/407,163

(22) Filed: Feb. 28, 2012

(65) Prior Publication Data

US 2013/0008806 A1 Jan. 10, 2013

Related U.S. Application Data

(60) Provisional application No. 61/447,287, filed on Feb. 28, 2011.

(51) Int. Cl.
*G01N 27/26* (2006.01)
*G01N 27/327* (2006.01)
*B01L 9/00* (2006.01)

(52) U.S. Cl.
CPC ............ *B01L 9/00* (2013.01); *B01L 2200/026* (2013.01); *B01L 2200/028* (2013.01); *B01L 2200/0689* (2013.01); *B01L 2300/0636* (2013.01); *B01L 2300/0645* (2013.01); *B01L 2300/0809* (2013.01); *B01L 2300/163* (2013.01)

(58) Field of Classification Search
None
See application file for complete search history.

(56) References Cited

U.S. PATENT DOCUMENTS

| | | | | |
|---|---|---|---|---|
| 5,611,907 | A * | 3/1997 | Herbst et al. | 205/742 |
| 6,924,107 | B2 | 8/2005 | Liu | |
| 2009/0270274 | A1 * | 10/2009 | Liu et al. | 506/9 |

FOREIGN PATENT DOCUMENTS

| | | | |
|---|---|---|---|
| WO | WO 2009/154710 | * 12/2009 | G01N 33/483 |

* cited by examiner

*Primary Examiner* — Gurpreet Kaur
(74) *Attorney, Agent, or Firm* — Myers Bigel Sibley & Sajovec, P.A.

(57) ABSTRACT

The present invention provides fluidic testing devices with fluidic flow channels for processing fluid samples.

21 Claims, 13 Drawing Sheets

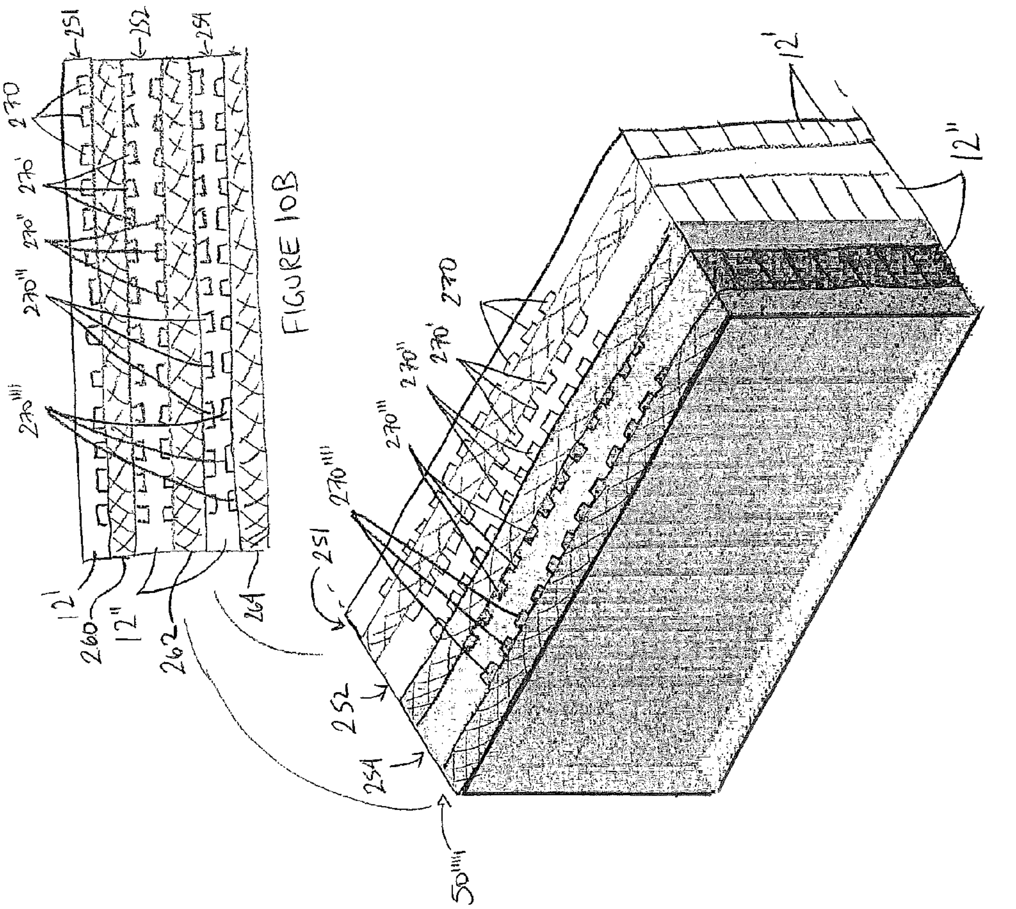
FIGURE 10B
FIGURE 10A
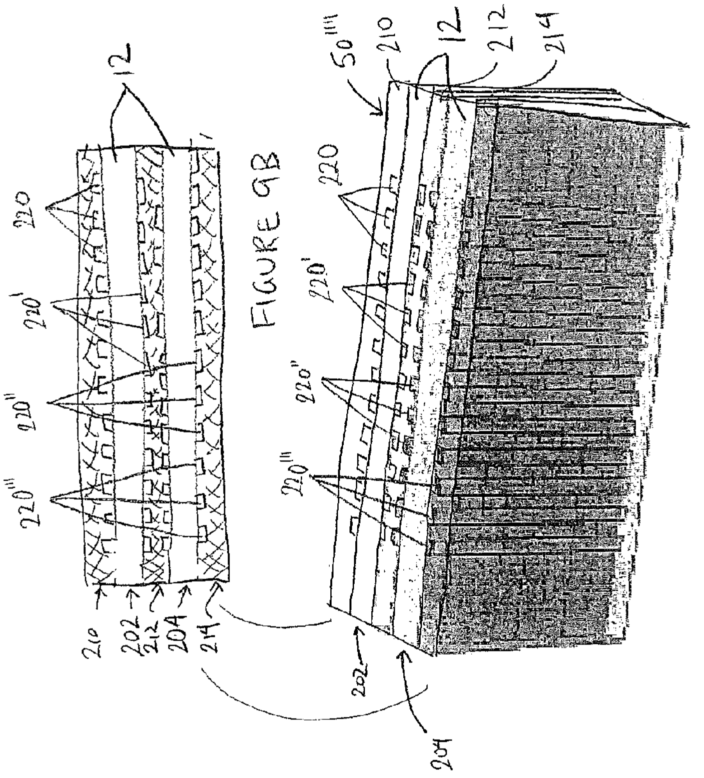
FIGURE 9B
FIGURE 9A

FLUID SENSORS AND RELATED DETECTORS AND METHODS

RELATED APPLICATIONS

This application claims the benefit of and priority to U.S. Provisional Application Ser. No. 61/447,287 filed Feb. 28, 2011, the contents of which are hereby incorporated by reference as if recited in full herein.

FIELD OF THE INVENTION

The present invention relates to fluidic testing devices.

BACKGROUND

Biochip and sensor technologies have become increasingly popular to test samples for biological or other parameters, in the research environment, as well as in clinical diagnostics and home spaces. However, there remains a need to provide easily assembled customizable or need-specific configurations.

SUMMARY OF EMBODIMENTS OF THE INVENTION

Embodiments of the present invention are directed to fluid testing devices and kits thereof, as well as one or more of detectors, analyzers and methods of generating, detecting and/or analyzing fluid test data, directly or indirectly.

Embodiments of the invention are directed to a multi-channel test block with selectable test bars to analyze air, water, or food to monitor for and/or detect environmental toxins or hazards.

Other embodiments are directed to a multi-channel test block with selectable test bars to analyze biosamples such as, but not limited to, blood, saliva, urine, hair or tissue for DNA matching and/or for medical analysis.

Some embodiments of the present invention are directed to fluidic testing devices comprising a test block holder and one or more testing blocks, each having a test surface. The test block holder engages a testing block to form one or more fluidic flow channels in fluid communication with the test surface of the testing block. The test block holder may engage multiple testing blocks to form one or more fluidic flow channels in fluid communication with the test surfaces of the testing blocks. In some embodiments, the fluidic flow channel is a microfluidic flow channel.

In particular embodiments, the fluidic testing device includes multiple testing blocks, and may include between one and one thousand testing blocks. The testing blocks may be slidably and releasably attached to the test block holder. One or more testing blocks may reside side by side in the test block holder, and/or they may reside one on top of another.

In some embodiments, a testing block defines an electrode set alone or in combination with the test block holder. The electrode set includes one or more working electrodes, a reference electrode and a counter electrode. Each electrode in the electrode set may be positioned one above another. A testing block may include an electrical insulator positioned between each of the electrodes. The electrical insulator may isolate each of the electrodes from the other electrodes. A testing block may include multiple electrode sets.

In other embodiments, the testing block defines a biochip.

The test block holder may include a groove, positioned between the test block holder and each of the testing blocks to define a fluidic flow channel. In one embodiment, the testing blocks are substantially rectangular, and the test block holder has correspondingly-shaped substantially rectangular channels. The channels are spaced apart and substantially coplanar, and each channel is configured to slidably receive one testing block. In other embodiments the testing blocks engage with the test block holder substantially orthogonal to the groove(s).

In some embodiments, the testing blocks include one or more grooves positioned between the test block holder and the testing blocks to define one or more fluidic flow channels. The groove or grooves are positioned in the testing blocks such that when the testing blocks are engaged with the test block holder, the groove or grooves align to form one or more fluidic flow channels.

In some embodiments, at least a portion of the test surface of a testing block comprises a predetermined material analyte for contacting a sample flowing through one or more channels. The predetermined material may include a bioactive material of one or more of the following: an antibody, an antigen, a nucleic acid, a peptide nucleic acid, a ligand, a receptor, avidin, biotin, Protein A, Protein G, Protein L, a substrate for an enzyme and any combination thereof. In some embodiments, a second portion of the test surface comprises a different predetermined material analyte for contacting a sample flowing through one or more channels.

Other embodiments are directed to a fluidic testing kit for providing different test alternatives. A fluidic testing kit includes a plurality of testing blocks configured to slidably engage a holder. Each testing block is configured to test for at least one predetermined parameter. Different testing blocks may be configured to test for different predetermined parameters. The testing blocks may be packed individually or in sets in a sterile package.

In one embodiment, the testing blocks are sensors comprising a set of electrodes. In other embodiments, the testing blocks are biochips with one or more bioactive materials. In some embodiments, the kit includes some testing blocks that are sensors, and some testing blocks that are biochips.

Yet other embodiments are directed to methods of monitoring fluid samples for detecting parameters. The methods include: (a) providing a fluidic testing device including a test block holder and at least one testing block having a test surface configured to contact a liquid sample, wherein the test block holder engages the at least one testing block to form a fluidic flow channel bordering the test surface; (b) flowing fluid samples through the fluidic flow channels; and (c) detecting whether a fluid sample tests positive for a selected analyte based on a response of at least one testing block in a respective fluidic flow channel. In some embodiments, the fluid sample is a biological sample from a human or animal.

In one embodiment, the flowing step includes flowing at least one of the fluid samples by a plurality of different testing blocks to test for different parameters. In other embodiments, the flowing step includes serially flowing a respective fluid sample through a plurality of different fluidic flow channels in the fluidic testing device. In some embodiments the flowing step includes both flowing at least one of the fluid samples by a plurality of different testing blocks to test for different parameters and serially flowing a respective fluid sample through a plurality of different fluidic flow channels in the fluidic testing device.

Still other embodiments are directed to systems for testing fluid samples. The systems include a test block holder, multiple user-selectable testing blocks, and a portable reader. The testing blocks are slidably attachable to the test block holder by a user. The portable reader couples to the testing blocks and detects whether a fluid sample tests positive for a selected parameter based on an output or response of at least one of the plurality of testing blocks In some embodiments, the testing blocks reside orthogonal to flow channels. In other embodiments, the testing blocks reside parallel to flow channels.

It is noted that features of embodiments of the invention as described herein may be methods, systems, computer programs, or a combination of the same, although not specifically stated as such. The above and other embodiments will be described further below.

Further features, advantages and details of the present invention will be appreciated by those of ordinary skill in the art from a reading of the figures and the detailed description of the embodiments that follows, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Further, any feature or sub-feature claimed with respect to one claim may be included in another future claim without reservation and such shall be deemed supported in the claims as filed. Thus, for example, any feature claimed with respect to a method claim can be alternatively claimed as part of a device, system, circuit, computer readable program code or workstation. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 9A is an isometric view of a fluidic testing device showing a grooved test block holder engaged to two layers of testing blocks according to embodiments of the present invention.

FIG. 9B is a top or side view of the fluidic testing device of FIG. 9A according to embodiments of the present invention.

FIG. 10A is an isometric view of a fluidic testing device showing a test block holder engaged to a plurality of layers of grooved testing blocks according to embodiments of the present invention.

FIG. 10B is a top or side view of the fluidic testing device shown in FIG. 10A according to embodiments of the present invention.

DETAILED DESCRIPTION OF EMBODIMENTS OF THE INVENTION

Figure 1B:
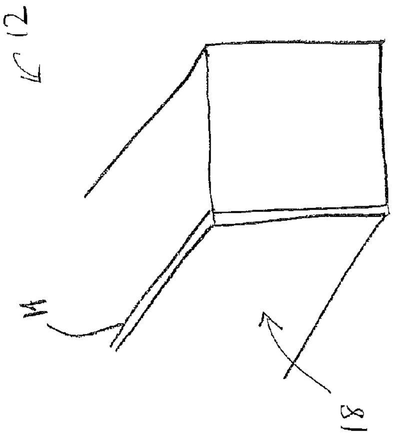
FIG. 1B is an enlarged partial end perspective view of a single one of the testing blocks of FIG. 1A including a test material.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Also as used herein, phrases such as "between X and Y" and "between about X and Y" should be interpreted to include X and Y. Furthermore, phrases such as "between about X and Y" can mean "between about X and about Y." Also, phrases such as "from about X to Y" can mean "from about X to about Y."

Further, the term "about" as used herein when referring to a measurable value such as an amount or numerical value describing any sample, flow rate, composition or agent of this invention, as well as any dose, time, temperature, and the like, is meant to encompass variations of ±20% or lower, such as, for example, ±10%, ±5%, ±1%, ±0.5%, or even ±0.1% of the specified amount.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can include portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

The term "testing block" refers to a bar, stick or other shaped member, typically an elongate member configured to test for one or more defined or predetermined parameters. A respective testing block may have one or more test surfaces for performing analysis of a test sample, and a testing block may be coated with a testing material on one or more surfaces. A testing block may be configured to engage with a test block holder either before or after interacting with a test sample. In various embodiments, a testing block is configured to use in a lab, a doctor's office, a hospital, a veterinary office, in a home, office, school or in field work. A testing block may be configured for prompt onsite testing, analysis, and also typically can provide visual test results.

The term "sensor" refers to a device having one or more test surfaces or electrodes that can include analytical sites arranged on and/or in one or more substrates that permit one or more analyses to be performed on one or more fluid samples (e.g., microsamples) at the same time and/or at different times, typically, but not limited to, via flowable throughput through fluidic channels in a test device. The fluid test sample can be in or comprise substantially gas or liquid. The test sample may include solid or particulate matter in the fluid. The flowable throughput may, in some embodiments, be high throughput conditions at a rapid flow rate(s). Flow speed can range from about 1 ml per minute for a simple flow-through assay (e.g., a sample passes through a respective fluid channel relatively slowly and no incubation is needed) to about 10 ml per minute (or more) for some tests or assays. The term "3D" or "three-dimensional" sensor or sensor array refers to a sensor with a stacked (one over another) electrode arrangement. The term "sensor array" means that the device has more than one sensor, typically arranged in a repeating or partially repeating pattern or layout on one or more layers or surfaces. The term "4D" or "four-dimensional" sensor or sensor array refers to a sensor device that includes multiple sensors in a respective fluid channel that can carry out multiple tests per sample and/or analyze multiple samples, serially and/or in parallel. The multi-dimensional sensor arrays contemplated by embodiments of the present invention can be configured to concurrently accept and test multiple different samples and perform multiple different analyses on those samples and/or serially test a single sample or a plurality of samples.

A "fluidic flow channel" refers to a continuous or uninterrupted fluid pathway or channel typically extending through a fluidic testing device, and typically with an opening at either an outside edge, an end or top or bottom of the fluidic testing device (i.e., an inlet and an outlet) to allow the passage of fluid therethrough, from a sample entry location to a sample discharge location. The device can be configured to re-circulate or flow the fluid sample through one or more channels over time, such as by using different fluid delivery systems, including, for example, pumps, vacuums or capillaries. A "microfluidic" flow channel is a miniaturized fluidic flow channel that accommodates a small fluid volume, typically between microliters and nanoliters of fluid. The microfluidic flow channel typically can hold or accommodate microscale amounts, e.g., microliters or less, such as, for example, 100 microliters or less, including nanoliters of fluid, which can be in the form of a gas or liquid as noted above. In some particular embodiments, each channel can, for example, hold from a sub-microliter volume (e.g., about 0.1 μl) to about a 100 μl volume. In some embodiments, for example, a channel can hold between about a 1 μl volume to about a 10 μl volume. For example, if one channel holds about 2 μl of liquid, a fluidic testing device with 20 channels can process about 40 μl of sample. The testing device can be configured so that all flow channels are the same size or so that some flow channels are larger and can accommodate larger volumes than other flow channels.

The fluidic testing devices of the present invention can be configured into any suitable geometric shape. In some embodiments, the fluidic testing devices are configured as multi-layer boxes. The term "box" is not limited to a "box" shape, but is used broadly to refer to a box-like shape, such as a substantially rectangular shape or cube shape. However, the fluidic testing devices may have any desired geometric shape, and are not required to have a straight edge.

The term "bioactive" includes the term "bioreactive" and means an agent or material or composition that alone or when combined with another agent and exposed to a test sample will undergo a chemical or biological reaction and/or be altered in appearance or in another optically or electronically readable or detectable manner when a target analyte, e.g., constituent, antigen, antibody, bacterium, virus, ligand, protein contaminant, toxin, radioactive material and/or other material is present in the test sample. See, e.g., U.S. Pat. No. 6,294,107, the contents of which are hereby incorporated by reference as if recited in full herein.

Embodiments of the invention are directed to onsite assembly and office diagnostics. For example, embodiments of the present invention may be used to test biological samples such as blood, saliva, urine or other bodily fluids. Other biological samples include for example skin samples, hair, or inhaled/exhaled breath. Some embodiments of the invention may be also suitable for home, lab or field testing of water systems, terrestrial or extraterritorial environments or fluids. For example, embodiments of the present invention may be used to monitor commodities or environments that may be subject to a security and/or health risk, e.g., air sampling, sampling of water systems including water treatment systems, home or restaurant drinking water and sampling of components or environments in food industries such as food production systems or even at home or restaurants and the like.

In some embodiments, the test blocks and test device can be ordered online via a worldwide computer network, such as the Internet. A person can simply order the particular blocks (from a predefined list of different testing choices) desired to carry out the desired test or monitoring, e.g., a test set directed to monitoring a home environment for environmental hazards (e.g., air hazards or water hazards including radioactive and other toxins or hazards). The test blocks can be easily assembled to the test block and operated onsite. The test blocks may be configured to allow a non-sophisticated or trained user to analyze the results (e.g., a visual color or an indication of positive or negative results). It is also envisioned, that non-clinical (medical) personnel can do self-tests for strep or other diseases and the like, at a discounted price relative to medical testing services. Of course, medical personnel may also use the test blocks for office or laboratory medical and environmental testing.

Figure 1C:
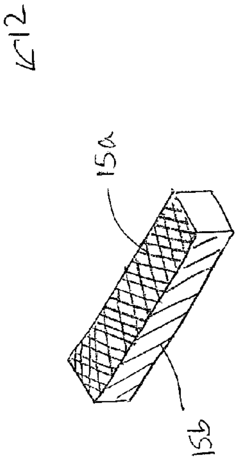
FIG. 1C is an isometric view of a single one of the testing blocks of FIG. 1A having two test surfaces and two test materials according to embodiments of the present invention.
Figure 1D:
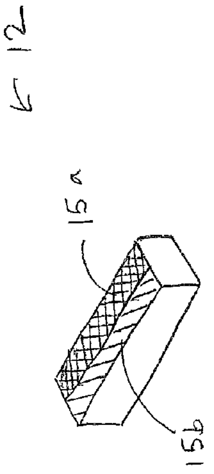
FIG. 1D is an isometric view of a single one of the testing blocks of FIG. 1A having two test materials according to embodiments of the present invention.
Figure 1A:
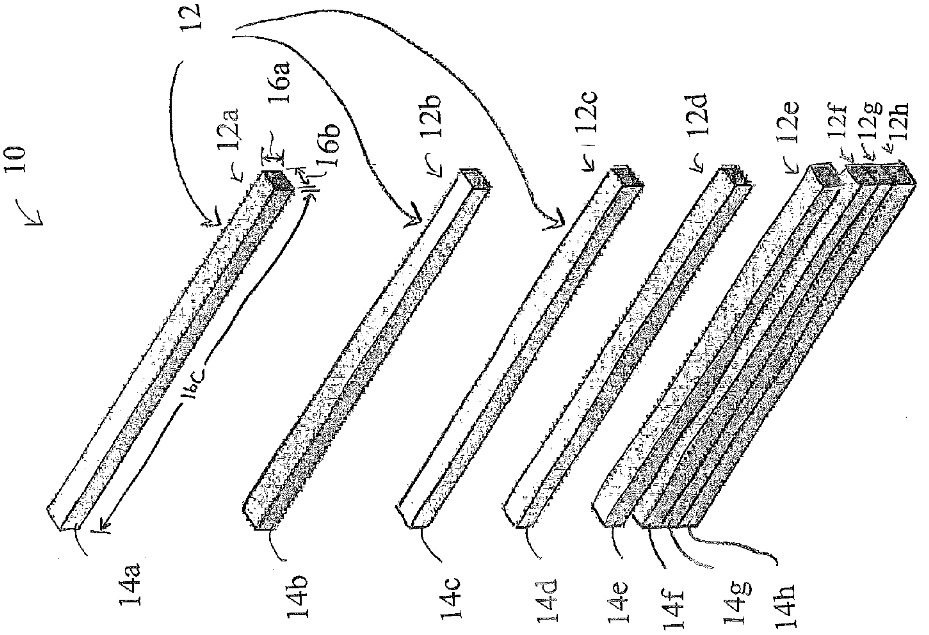
FIG. 1A is a partially exploded isometric view of a set of testing blocks according to embodiments of the present invention.

Turning now to the figures, FIG. 1A illustrates a set 10 of testing blocks 12, shown as blocks 12*a*-12*h*. More or fewer testing blocks 12 may be used or provided, and the testing blocks 12 may be selected and used individually or in sets. Each testing block 12 is configured to test for one or more elements. A testing block 12 has a height 16*a*, a width 16*b*, and a length 16*c*. A primary test surface 14, shown as 14*a*-14*h*, respectively, of the testing blocks 12*a*-12*h*, may include one or more materials that can form the test surface 14. The test surface 14 includes one or more analytical test sites.

FIG. 1B illustrates a material 18 may be applied to the test surface 14. The material 18 may be a bioactive material such as an antigen or an antibody. For example, the material 18 may be formed into or on the substrate of the testing blocks 12. Thus, the material or materials 18 forming the test surface 14 may be applied in any suitable manner. For example, the testing blocks 12 or portions thereof may be coated, covered, impregnated, vapor deposited, permeated, plated, soaked and/or embedded with a bioactive agent or material. Different ones of the testing blocks 12*a*-12*h* may include different materials and/or different fabrication techniques. The material 18 may also be applied by a shrink-wrap or adhesively attachable strip or patch. In certain embodiments, a testing block 12 is immersed or soaked in a solution comprising the bioactive agent or material 18, resulting in the presence of the bioactive agent or material 18 on all surfaces of the testing block 12.

The material 18 may reside on or over substantially all or all of the test surfaces 14 or the material 18 may be applied selectively to portions of one or more of the test surfaces 14. The same material may be applied to the entire test surface 14 or combinations of different materials may be applied to different locations on a respective primary testing block surface 14 in any combination. The material may be integrated with or applied to opposing primary surfaces (not shown). Each testing block 12 may have the same or different material or materials.

FIG. 1C shows a testing block 12 having a first material 15*a* on a first test surface on the top side of the testing block 12 and second material 15*b* on a second test surface on the front side of the testing block 12. Thus, in FIG. 1C, the materials 15*a* and 15*b*, and thus the analytical sites are located on multiple sides of the testing block 12. Note that the first 15*a* and second 15*b* materials may be the same material. FIG. 1D shows a testing block 12 having the first material 15*a* and the second material 15*b* side-by-side on the same test surface on the top side of the testing block 12. The embodiment shown in FIG. 1D illustrates that more than one test material or analytical site may be located on any side of the testing block 12.

As shown in FIG. 1A, the testing blocks 12 may be elongated rectangular bars. However, according to other embodiments, the testing blocks 12 may be other shapes. Also, as shown in FIG. 1A, the testing block 12*a* has a height 16*a*, a width 16*b*, and a length 16*c*. The testing block 12*a* may have any selected ratio of height 16*a* to width 16*b* to length 16*c*.

Figure 2E:
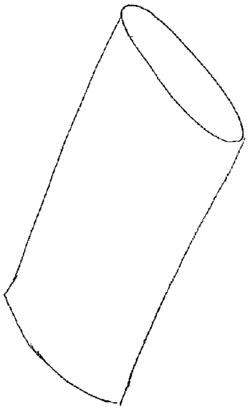
FIGS. 2A-2G are isometric views of exemplary alternative testing block configurations according to embodiments of the present invention.
Figure 2F:
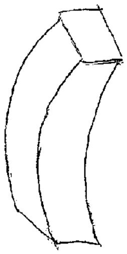
Figure 2G:
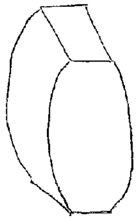
Figure 2A:
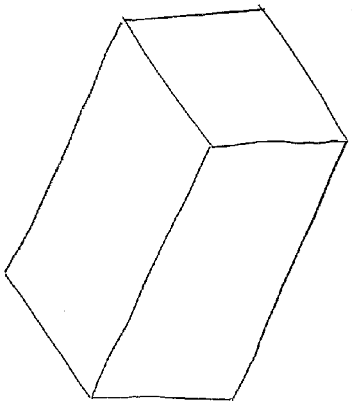
Figure 2B:
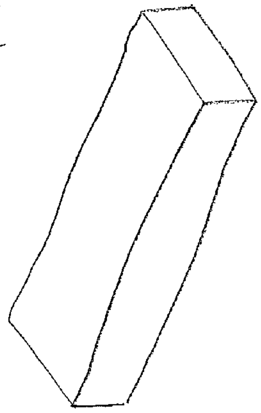
Figure 2C:
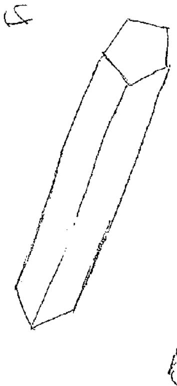
Figure 2D:
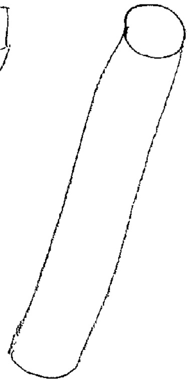

FIGS. 2A-2G illustrate other exemplary testing block shapes. FIG. 2A shows a shorter testing block (relative to FIG. 1A) with a substantially square cross-section, and FIG. 2B shows an elongated testing block with a width greater than a height. FIG. 2C shows a testing block with a substantially pentagonal cross-section. FIG. 2D shows a testing block with a circular cross-section, and FIG. 2E shows a testing block with an elliptical cross-section. In other examples, the testing blocks 12 may be bars with other geometrical cross-sectional shapes, e.g., triangular, quadrangular, hexagonal, or any polygonal shape. Furthermore, the ratio of the length to width to height of testing blocks 12 may be any selected ratio. In other examples, the testing blocks 12 may be square, spherical, or any other shape. FIG. 2F shows a testing block that curves upward along its length forming an arch. FIG. 2G shows a testing block have an elliptically-shaped length, such that its center has a greater height than either end.

Figure 3C:
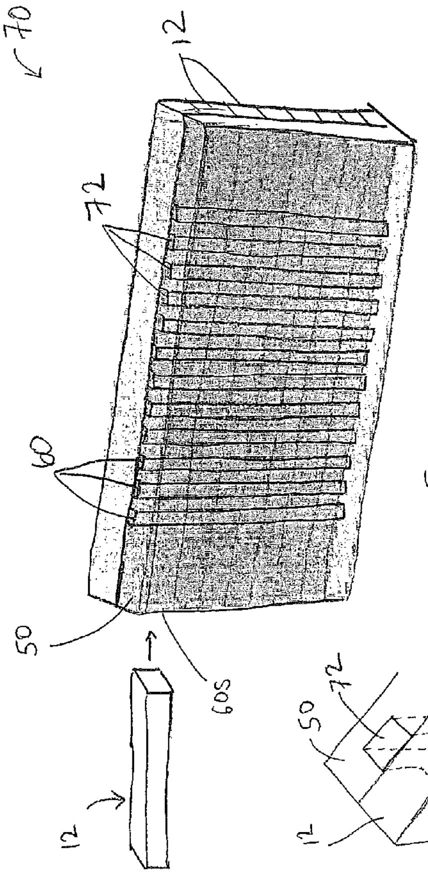
FIG. 3C is an isometric view of a fluidic testing device showing the test block holder of FIG. 3A engaged to a plurality of testing blocks according to embodiments of the present invention.
Figure 3D:
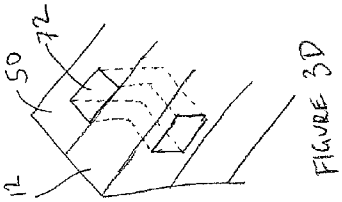
FIG. 3D is an exploded isometric view of a partial test block holder engaged to a testing block illustrating an exemplary alternative channel configuration according to embodiments of the present invention.
Figure 3E:
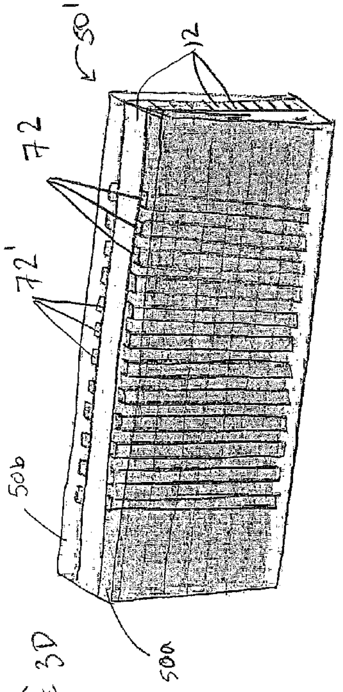
FIG. 3E is an isometric view of a fluidic testing device showing an exemplary test block holder engaged to testing blocks according to embodiments of the present invention.
Figure 3A:
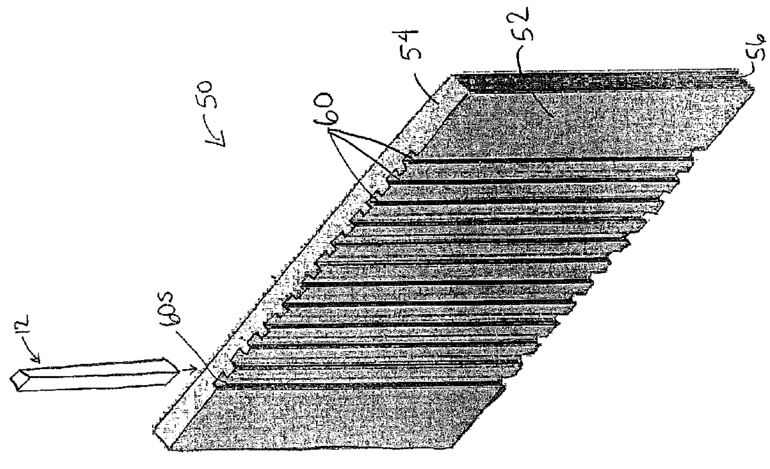
FIG. 3A is an isometric view of a test block holder according to embodiments of the present invention.

FIG. 3A illustrates a test block holder 50 including grooves 60 in a first primary surface 52. The grooves 60 extend across the holder 50 from a first side 54 (shown as the top) of the test block holder 50 to the opposing side 56 (shown as he bottom) of the test block holder 50. In other embodiments, the grooves 60 may extend only part way down from one side 54, 56 of the test block holder 50. While all the grooves 60 are shown to extend down about perpendicular to the first side 54, each groove 60 may extend down at any selected angle. The grooves 60 shown in FIG. 3A are rectangular with one open side. The grooves 60 may be any selected shape. The shape of the grooves 60 may be selected to engage with a corresponding testing block 12. In some examples, the grooves 60 may be hemi-cylindrical, elliptical, triangular, quadrangular, pentagonal, or any k-sided polygonal shape. The grooves 60 may have one open side. The test block holder 50 may include any selected integer number of grooves 60. In one embodiment, one groove 60 may engage a corresponding one or more testing blocks 12. In some embodiments, discussed below with respect to FIG. 6, the test block holder 50 does not require grooves. The test block holder 50 may be electrically insulating.

In some embodiments, the test block holder 50 is configured to snugly receive one or more of the testing blocks 12. In one example, the test block holder 50 may include grooves 60 that define insertion slots 60*s* for receiving one or more testing blocks 12. The testing blocks 12 may be inserted (FIG. 3A) into the insertion slots 60*s* either from one end, such that the entire length of the testing block 12 is pushed through the insertion slot 60*s*, or from a side surface, such that the entire testing block 12 can be pushed into place at once. In another example, the test block holder 50 is configured such that the testing blocks 12 can be snapped into a selected position on the test block holder 50.

Figure 3B:
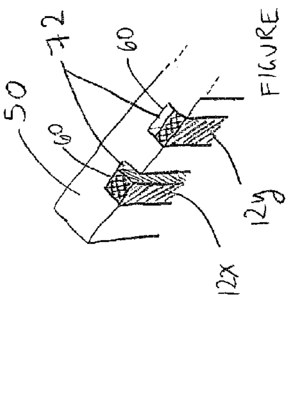
FIG. 3B is an exploded isometric view of a test block holder and two testing blocks according to embodiments of the present invention.

FIG. 3B shows an exploded view of a first and second testing block 12*x*, 12*y* respectively, attached to a test block holder 50. Testing block 12*x* and/or groove 60 is shaped such that when inserted into the testing block groove 60, a flow channel 72 remains next to the testing block 12*x*. Testing block 12*y* is shaped such that when inserted into the testing block groove, a flow channel 72 is created along the inner side of the groove 60 between the testing block 12*y* and the test block holder 50.

In another embodiment, as shown in FIG. 3C, the insertion slots 60*s* may be positioned substantially perpendicular to the grooves 60, such that the testing blocks 12 slide in perpendicular to the grooves 60, and the grooves 60 become fluidic flow channels 72. FIG. 3C is an isometric view of a fluidic testing device 70 showing the test block holder 50 attached to a plurality of test blocks 12. The grooves 60 in the test block holder 50 with the test blocks 12 form a first set of channels 72 in the fluidic testing device. Each channel 72 may define a separate test path which can expose a test sample to a plurality of different test sites at a single testing block 12 or at different testing blocks 12. In various embodiments, each testing block 12 may perform a different test to test for different parameters, or each testing block 12 may perform the same test or tests for reliability and/or redundancy or for different patient samples. In other embodiments, each testing block 12 may perform more than one test.

While the cross-sectional area of the channels 72 in FIGS. 3B-3C is shown as rectangular, in other embodiments, the channels 72 may be any selected shape. For example, the cross-sectional area of the channels may be circular, elliptical, triangular, quadrangular, pentagonal, or polygonal. Additionally, while the channels 72 are shown to extend in parallel from one side of the test block holder 50 to the opposite side of the test block holder 50, in other embodiments, the channels 72 may extend from a first side of the test block holder 50 in any selected pattern. In other examples, the channels 72 may extend at a different angle (i.e., not perpendicular) with respect to the first side of the test block holder 50, and the channels 72 may not be parallel with each other. In some embodiments, the channels 72 may not extend through to the opposite side, or may extend to a side that is not opposite the first side. FIG. 3D shows an exemplary embodiment in which the fluid exits through the testing block 12 rather than the holder 50.

Furthermore, while according to the illustrative embodiments of FIGS. 3A and 3C, the channels 72 includes twelve discrete channels, in other embodiments, the channels 72 may include any selected number of channels. For example, the channels 72 may include from about one to about fifty channels, from about ten to about one hundred channels, from about one hundred to about five hundred channels, or even more than about five hundred channels 72.

FIG. 3E is a schematic illustration of a test block holder 50' engaged to testing blocks 12. The test block holder 50' is configured such that the testing blocks 12 are inserted between first 50*a* and second 50*b* sides of the test block holder 50'. The first 50*a* and second 50*b* sides of the test block holder 50' each include grooves 60 as discussed above, which form first and second sets of channels 72, 72', respectively. In some embodiments, the second set of channels 72' includes the same number of channels as the first set of channels 72, in other embodiments, the second set of channels 72' includes more channels than the first set of channels 72, and in still other embodiments, the second set of channels 72' includes fewer channels than the first set of channels 72. In some embodiments, the test block holder 50' is configured to test two layers of testing blocks 12. In one example, two layers of testing blocks 12 may be attached between the first 50*a* and second 50*b* sides of the test block holder 50'.

According to one embodiment, the testing blocks 12 are biochips. Each testing block 12 may define a multiple panel biochip configured to test for multiple parameters. Additionally, a fluid testing device with multiple testing blocks 12 engaged to a test block holder 50 may define a multiple panel biochip configured to test for multiple parameters. The term "biochip" refers to a device having one or more analytical sites arranged on and/or in one or more substrates that permits one or more analyses to be performed on one or more fluid samples (e.g., microsamples) at the same time and/or at different times, typically via flowable throughput through fluidic channels in the device. The fluid test sample can be in substantially gas or liquid form, but is typically liquid. The test sample may include solid or particulate matter in the fluid. The flowable throughput may, in some embodiments, be high throughput conditions at a rapid flow rate(s). Flow speed ranges from about 1 μl per minute for a simple flow through assay (e.g., sample passes through the channel slowly and no incubation is needed) to about 10 ml per minute (or more) for some assays. The biochip is typically configured to concurrently accept and test multiple different samples and perform one or multiple different analyses on those samples.

Figure 4:
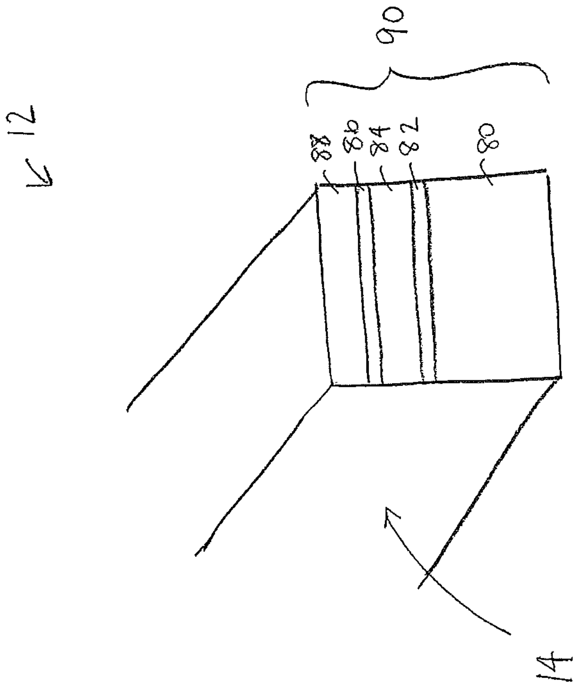
FIG. 4 is an enlarged partial end perspective view of an exemplary single testing block of FIG. 1A illustrating a different operational configuration (i.e., a set of electrodes) according to embodiments of the present invention.

According to another embodiment, the testing blocks 12 include electrode sets. FIG. 4 is an exemplary testing block 12 illustrating an embodiment in which the testing block 12 is a sensor and includes a set of electrodes 90. The set of electrodes 90 is substantially vertically-stacked and includes a working electrode 80, a reference electrode 84, and a counter electrode 88. As shown in FIG. 4, an electrical insulator 82, 86 may reside between the working electrode 80, the reference electrode 84, and the counter electrode 88. Note that the electrodes 80, 84, and 88 may be arranged in any selected order. In one example, the working electrode 80 is positioned between the counter electrode 88 ad the reference electrode 84. Additionally, a testing block 12 may include multiple sets of electrodes 90. Although the sensor electrode group 90 is shown in block form in FIG. 4, this shape is merely for ease of discussion.

According to one feature, the working electrode 80 may include a material 18. When there are several working electrodes 80, each one may include the same material, each one may include a different material, or each one may include a different concentration or formulation of the same material for sensitivity or specificity of concentration or the like. Hence, a testing block 12 can carry out a number of different tests e.g., tests n=1, to n, where "n" is any number between 1 and 500,000, typically, less than 100,000, in some embodiments between about two and about 3000, and in some embodiments between about 1 and about 1000.

In particular embodiments, the working electrode 80 has a thickness that is between about 0.05 mm to about 12 mm. The counter electrode 88 may comprise inert materials, such as noble metals or graphic carbon to avoid dissolution. Commonly used reference electrodes 84 include silver/silver-chloride electrodes, calomel electrodes, and hydrogen electrodes. The surface of a working electrode 80 is typically where the biochemical reactions take place. Besides behaving as an electrode for electroanalysis, the capture biomolecules, such as proteins, antibodies, antigens, or DNA probes, may be coated or otherwise disposed on the surface of the working electrode 80. The surface chemical properties of a working electrode 80 may vary depending on applications. For coating proteins on a working electrode 80, for example, the surface may be plated with a thin layer of gold.

The insulators 82, 86 both electrically insulate and provide a fluid seal between the adjacent layers, at least upon assembly. That is, the entire stacked configuration can be compressed together and the insulators 82, 86 define the fluid seal. Alternately, the fluid seal can exist upon assembly of the adjacent layers, such as by size and configuration or attachment means, including adhesive, brazing, welding and the like. Examples of suitable insulator materials include, for example, silicone rubber and certain thermo elastomers such as, for example, Versaflex®, and can, in some embodiments, have thicknesses ranging from between about 0.05 mm to about 10.0 mm Different insulator materials can be used for different layers (or even partial layers).

Note that the term "insulator" refers to a material that can provide electrical insulation between one or more adjacent components, e.g., between a counter and reference electrode and/or between a reference and working electrode. The insulator may also be able to provide fluid isolation between stacked layers. In other embodiments, two or more insulator layers may be used: at least one for electrical isolation and at least another one for fluid sealant. The fluid sealant material can cooperate with adjacent layers to define a substantially fluid-tight seal. The fluid sealant may be a thin gasket layer of any suitable material, such as, for example, a polymer, rubber, and/or metal. In some embodiments, the fluid sealant can be integrated into the electrical insulator and/or laminated and/or otherwise attached thereto. Where gaskets are used, the gasket may have a thickness that is substantially the same or more or less than an adjacent electrode layer, and is typically thinner than at least the working electrode layer. In some embodiments, the gasket can be formed of an elastically compressible material. In some embodiments, the fluid sealant can comprise a gasket of thermoplastic elastomers (including but not limited to Viton®, Buna-N, EPDM, and Versaflex® materials) and/or silicone rubbers.

Figure 5:
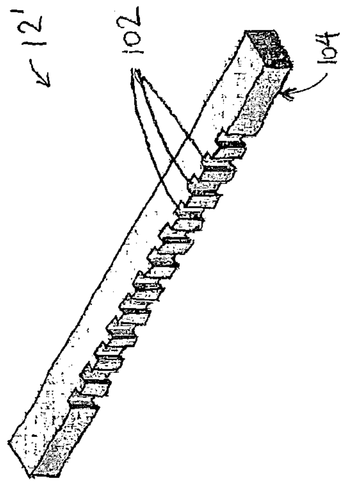
FIG. 5 is an isometric view of a single testing block illustrating an alternative configuration with multiple grooves according to embodiments of the present invention.

FIG. 5 illustrates another configuration of a testing block 12' configured to test for one or more parameters. The testing block 12' is substantially similar to the testing blocks 12, discussed above. The testing block 12' includes grooves 102. The grooves 102 are positioned on the test surface 104 of the testing block 12'. The test surface 104, including the surface of the walls of the grooves 102, may include one or more materials such as the material 18 discussed above.

Figure 6B:
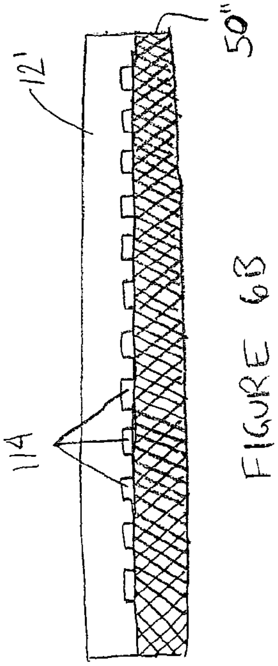
FIG. 6B shows a top or side view of the fluidic testing device of FIG. 6A.
Figure 6A:
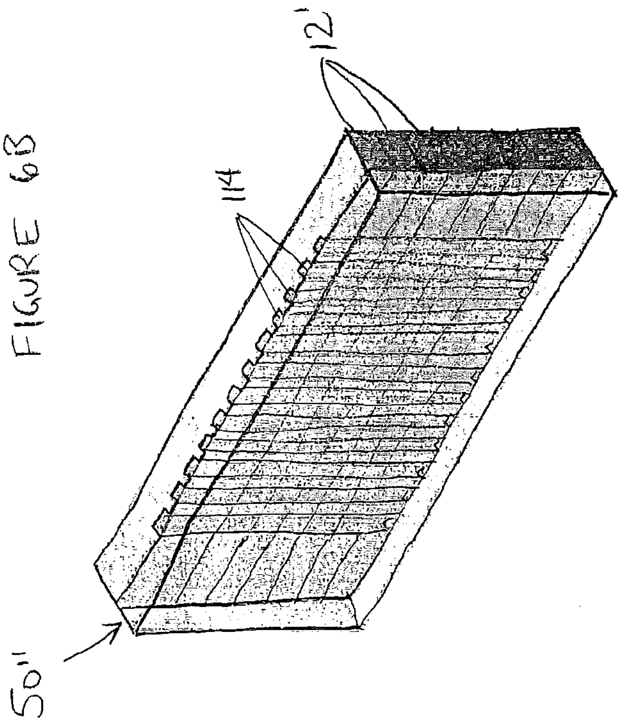
FIG. 6A is an isometric view of a fluidic testing device showing a test block holder engaged to grooved testing blocks such as that shown in FIG. 5 according to embodiments of the present invention.

The testing block 12' may be used in conjunction with multiple other similarly sized and shaped testing blocks 12' or with multiple differently sized and/or shaped testing blocks 12'. FIG. 6A shows multiple testing blocks 12' engaged to a test block holder 50", thereby forming fluid channels 114. Note that in the illustrated embodiment of FIG. 6A, the fluid channels 114 are created using the grooves 102 in the testing blocks 12'. FIG. 6B shows a top or side view of the test block holder 50' engaged to the testing block 12'. In other embodiments, there may be cooperating grooves 102 in both the testing blocks 12' and the test block holder 50".

Figure 7:
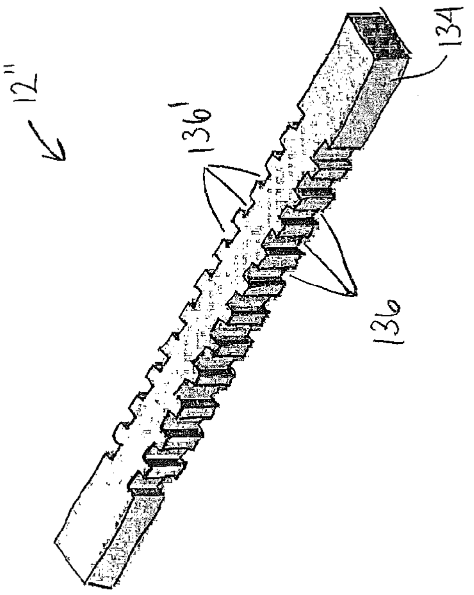
FIG. 7 is an isometric view of a single testing block having grooves on two sides according to embodiments of the present invention.

FIG. 7 shows a testing block 12" and illustrates an embodiment in which the testing block 12" has a first set of grooves 136 and a second set of grooves 136' positioned on two opposing surfaces. The testing block 12" may be substantially similar to the testing block 12' of FIG. 5. In other embodiments, the testing block 12" may have grooves 136, 136' on any selected surface. The second set of grooves 136' is substantially similar to the first set of grooves 136. In some embodiments, the second set of grooves 136' includes the same number of grooves as the first set of grooves 136, in other embodiments, the second set of grooves 136' includes more grooves than the first set of grooves 136, and in still other embodiments, the second set of grooves 136' includes fewer grooves than the first set of grooves 136. In some embodiments, the testing block 12" may have protrusions that slidably engage grooves in a test block holder.

Figure 8:
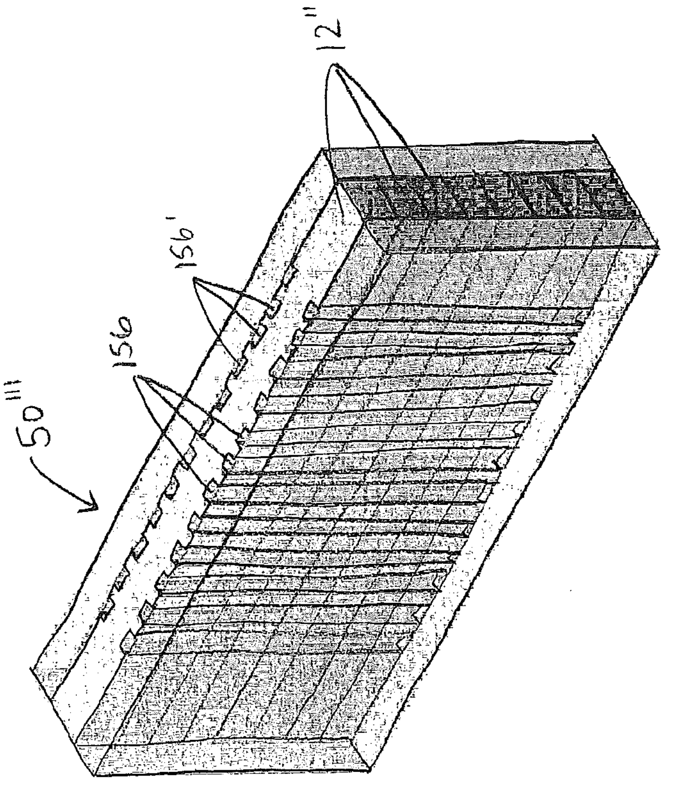
FIG. 8 is an isometric view of a fluidic testing device showing a test block holder engaged to grooved testing blocks according to embodiments of the present invention.

The testing block 12" may be used in conjunction with multiple other similarly sized and shaped testing blocks. FIG. 8 shows testing blocks 12" engaged with a test block holder 50'". In some embodiments, the test block holder 50'" may slidably receive the testing blocks 12". The test block holder 50'" is engaged to a first side of the set of testing blocks 12", thereby forming a first set of fluid channels 156, and to a second side of the set of testing blocks 12", thereby forming a second set of fluid channels 156'. As shown in FIG. 8, the second side of the set of testing blocks 12" directly opposes the first side. Note that in the illustrated embodiment of FIG. 8, the first and second sets of fluid channels 156, 156' respectively, correspond to the grooves 136, 136' in the testing blocks 12". In other embodiments, there may be grooves 136, 136', in both the testing blocks 12" and the test block holder 50'". In one embodiment, the test block holder 50'" may include protrusions that can slidably receive the testing blocks 12". In this embodiment, the testing blocks 12" can slide into the test block holder 50'" and define a multi-layered or stack of testing blocks 12".

FIGS. 9A and 10A illustrate fluidic testing devices with multiple layers of testing blocks 12, 12', 12". FIG. 9A shows an isometric view of a fluidic testing device including a test block holder 50"", and first 202 and second 204 layers of testing blocks 12. FIG. 9B shows a top view of the fluidic testing device. The test block holder 50"" includes first 210, second 212, and third 214 test block holder segments, with the testing blocks 12 positioned in between. The first layer 202 of testing blocks 12 is positioned between the first and second segments 210, 212 of the test block holder 50"", and the second layer 204 of testing blocks 12 is positioned between the second and third segments 212, 214 of the test block holder 50". The first 210 and third 214 segments of the test block holder 50"" include grooves on one surface, while the second segment 212 of the test block holder 50"" includes grooves on two opposing surfaces. Thus, the first segment 210 of the test block holder 50"" and the first layer 202 of testing blocks 12 cooperate to form a first set of fluid channels 220. The second segment 212 of the test block holder 50" and the first layer 202 of testing blocks 12 cooperate to form a second set of fluid channels 220'. The second segment 212 of the test block holder 50"" and the second layer 204 of testing blocks 12 cooperate to form a third set of fluid channels 220". The third segment 214 of the test block holder 50"" and the second layer 204 of testing blocks 12 cooperate to form a fourth set of fluid channels 220'".

While the fluidic testing device shown in FIG. 9A includes two layers 202, 204 of testing blocks 12, in other embodiments, the fluidic sensor device may have three or more layers of testing blocks. Similarly, the testing block holder 50"" may include four or more segments. In many embodiments, the layers of testing blocks 12 are separated by grooved segments of a test block holder 50"", and cooperate with the grooved segment to form channels. The first 210 and third 214 segments of the test block holder 50"" of FIG. 9A each include twelve grooves on one surface, while the second segment 212 of the test block holder 50"" includes twelve grooves on each of two opposing surfaces. In other embodiments, the test block holder segments 210, 212, 214 may have any selected number of grooves on one, two, or more surfaces, and each segment 210, 212, 214 may have a different number of grooves or a different configuration of grooves. For example, ones of the test block holder segments may have between about one and about fifty grooves, between about one and one hundred grooves, between about fifty and five hundred grooves, or more than five hundred grooves.

Each channel 220, 220', 220", and 220'" resides in an X-Y location of the fluidic testing device and passes through a selected number of testing blocks 12. The testing blocks 12 may each be configured to test for a different predetermined element. Thus, in one example, if there are eight testing blocks 12, a sample passing through a fluid channel 220, 220', 220", 220'" is tested for eight different elements. Furthermore, each testing block 12 may be configured to test for multiple different elements. In one example, a testing block 12 may be configured to test for a different element at each channel 220, 220', 220", 220'". Each channel 220, 220', 220", and 220'" may define a different sample flow channel, allowing for a relatively large number of test samples to pass through the fluidic testing device or for one sample to be tested in the different channels 220, 220', 220", 220" over time. Thus, for example, if a fluidic testing device includes four rows, X=4, of twelve channels, Y=12, and if it has eight testing blocks 12 in each channel 220, 220', 220", 220'", Z=8, then there are 384 tests (4×12×8) available in the fluidic testing device and up to 48 samples can be accommodated (one in each channel 220, 220', 220", 220'").

FIG. 9A additionally illustrates that different selected testing block layers 202 and 204 may be assembled together to form a fluidic testing device. In the illustrated embodiment, the testing block layers 202, 204 are shown as configured the same for ease of assembly. Also, in this embodiment, the testing block layers 202, 204 are positioned horizontally adjacent to each other (side by side) within the test block holder 50" to form four rows of channels 220, 220', 220", 220'". The individual testing blocks 12, or alternatively, the testing block layers 202, 204, may be pre-assembled and provided to the lab, medical office, or field test agency or may be selected onsite for a particular application. As such, the testing blocks 12 may be supplied in kits of different sets of tests or ordered separately for subsequent assembly and use. In some embodiments, once assembled, the testing blocks 12 do not need to be disassembled to be analyzed or monitored. In other embodiments, each testing block 12 may be removed from the holder 50"" for analysis.

FIG. 10A shows an isometric view of a fluidic testing device including first 251, second 252, and third 254 layers of grooved testing blocks 12', 12", and a test block holder 50'"". FIG. 10B shows a top view of the fluidic testing device. The test block holder 50'"" includes first 260, second 262, and third 264 segments. The first layer 251 of grooved testing blocks 12' is positioned next to the first segment 260 of the test block holder 50'"". The second layer 252 of grooved testing blocks 12" is positioned between the first segment 260 and the second segment 262 of the test block holder 50'"". The third layer 254 of grooved testing blocks 212' is positioned between the second segment 262 and the third segment 264 of the test block holder 50'"".

The first segment 260 of the test block holder 50'"" and the first layer 251 of grooved testing blocks 12' cooperate to form a first set of fluid channels 270. The first segment 260 of the test block holder 50'"" and the second layer 252 of grooved testing blocks 12" cooperate to form a second set of fluid channels 270'. The second segment 262 of the test block holder 50'"" and the second layer 252 of grooved testing blocks 12" cooperate to form a third set of fluid channels 270". The second segment 262 of the test block holder 50'"" and the third layer 254 of grooved testing blocks 12" cooperate to form a fourth set of fluid channels 270'". The third segment 264 of the test block holder 50'"" and the third layer 254 of grooved testing blocks 12" cooperate to form a fifth set of fluid channels 270"".

The fluidic sensor device of FIG. 10A includes three layers 251, 252, 254 of grooved testing blocks 12', 12". In other embodiments, a fluidic sensor device may have four or more layers of grooved and/or non-grooved testing blocks 12, 12', 12". In many embodiments, the multiple layers of grooved testing blocks 12', 12" are separated by multiple segments of a test block holder, forming channels along the sets of grooved testing blocks. In other embodiments, the two or more layers of grooved testing blocks 12', 12" are positioned next to each other. In FIGS. 10A and 10B, the first layer 251 of grooved testing blocks 12' has twelve grooves on one segment, and the second 252 and third layers 254 of grooved testing blocks 12" have twelve grooves on each of two opposing segments. In other embodiments, the first layer 251 of grooved testing blocks 12', and the second 252 and third 254 layers of grooved testing blocks 12" may include any selected number of grooves on one, two, or more segments. In some embodiments, some of the testing blocks 12', 12" in a single layer may include a different number of grooves from other testing blocks 12', 12" in the layer.

Figure 11:
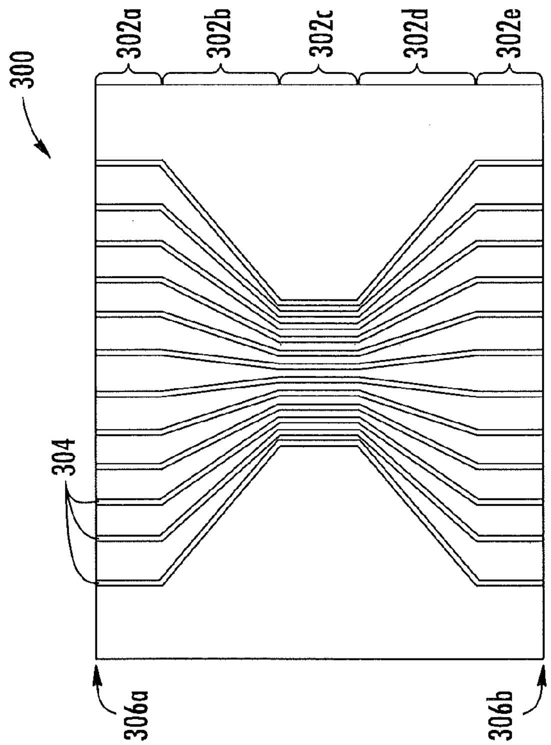
FIG. 11 is a schematic of a fluid flow path of a test block holder and/or a fluid delivery system according to embodiments of the present invention.

FIG. 11 shows one side surface 300 of a test block holder 50 (or other embodiment 50', 50", 50'", 50"", 50'"") illustrating an exemplary configuration of grooves or flow channels 304 for fluid delivery. In this embodiment, the test block holder is configured to engage with one or more testing blocks 12, 12', 12'" at the tapered section 302*c*. From the top edge 306*a* of the side surface 300, the grooves 304 first extend downward in parallel straight lines at section 302*a*. Then, at section 302*b*, the grooves bend at various angles toward the center, with the outermost grooves bending at the greatest angle and the innermost grooves bending very little, thereby creating a tapered pattern. At the center section 302*c* of the side surface 300, the grooves 304 extend downward once again in parallel. As the grooves 304 extend out from the center towards the bottom of the side surface 300 at section 302*d*, they once again angle outward expanding back toward their starting geometry. When the grooves 304 reach their original positions, at section 302*e*, the grooves 304 once again extend downward in parallel straight lines to the bottom edge 306*b* of the side surface 300. According to one embodiment, reactions, electronic imaging, or optical imaging of the fluidic testing device occurs at the tapered section 302*c* of the grooves 304. In other embodiments, the test block holder is configured to engage with one or more testing blocks 12, 12', 12'" at other sections, such as 302*a*, 302*b*, 302*d*, or 302*e*.

According to some embodiments, the top sections 302*a*, 302*b*, and the bottom sections 302*d*, 302*f*, comprise a fluidics assembly, configured to cause the fluid sample(s) to flow through the fluidic testing device, which is positioned at the tapered section 302*c*. The fluidics assembly may sealably engage with a fluidic testing device and cause a fluid sample (s) to flow through the device as is well known to those of skill in the art. The fluidics assembly resides in fluid communication with one or more of the channels in the fluidic testing device. The fluidics assembly is discussed below with respect to FIG. 16.

Figure 12:
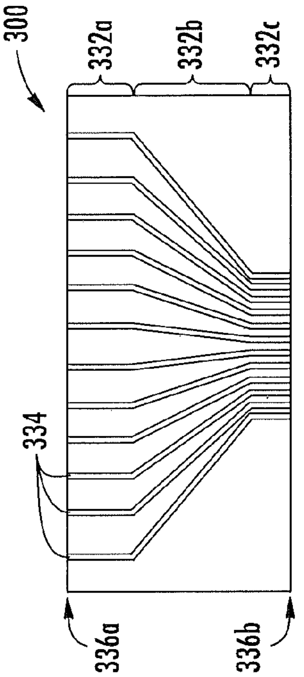
FIG. 12 shows a side surface of a test block holder and/or a fluid delivery system illustrating another exemplary configuration according to embodiments of the present invention.

FIG. 12 shows a side surface 330 of a test block holder 50 (or other embodiment 50', 50", 50'", 50"", 50'"") illustrating an exemplary tapered configuration of the grooves or flow channels 334 for fluid delivery, in which the grooves/flow channels expand only at one end, and do not re-expand following the tapered portion 332*c*. According to one embodiment, reactions, electronic imaging, or optical imaging of the fluidic testing device occurs at the tapered section 332*c* of the grooves 334. From the top edge 336*a* of the side surface 330, the grooves 334 first extend downward in parallel straight lines at 332*a*. Then, at 332*b*, the grooves bend at various angles toward the center, with the outermost grooves bending at the greatest angle and the innermost grooves bending very little, thereby creating a tapered pattern. At the center 332*c* of the side surface 330, the grooves 334 extend downward once again in parallel to the bottom edge 336*b* of the side surface 330.

According to some embodiments, the top sections 332*a*, 332*b* comprise a fluidics assembly, configured to cause the fluid sample(s) to flow through a fluidic testing device positioned at or below the tapered section 332*c*.

Figure 13:
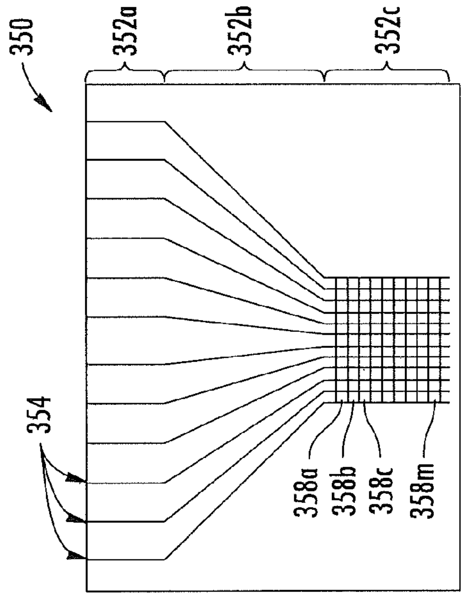
FIG. 13 shows a side surface of a test block holder and/or a fluid delivery system illustrating another exemplary configuration according to embodiments of the present invention.

FIG. 13 shows a side surface 350 of a test block holder illustrating another exemplary tapered configuration of the grooves 354, in which the grooves expand only at one end, and do not re-expand following the tapered portion 352*c*. At the tapered section 352*c*, the grooves 354 of FIG. 13 are coated with various materials 358*a*-358*m*. The materials 358*a*-358*m* may each be the same material, or they may include various different materials. The materials 358*a*-358*m* may be assays, and they may include any of the materials discussed above with respect to the material 18 of FIG. 1B. Additionally, each "stripe" of material 358*a*-358*m* may include several different materials. For example, one or more of the grooves 354 covered by a particular stripe of material may be coated with a different type of material from other ones of the grooves 354. In one embodiment, the side surface 350 is the side surface of a test block holder, and the materials 358*a*-358*m* are coated on a testing block set positioned directly adjacent to the side surface 350 of the test block holder, not on the side surface 350 or in the grooves of the test block holder itself. According to one embodiment, reactions, electronic imaging, or optical imaging of the fluidic testing device occurs at the tapered section 352*c* of the grooves. According to some embodiments, the top sections 352*a*, 352*b* comprise a fluidics assembly, configured to cause the fluid sample(s) to flow through a fluidic testing device positioned at the tapered section 352*c*.

Figure 14:
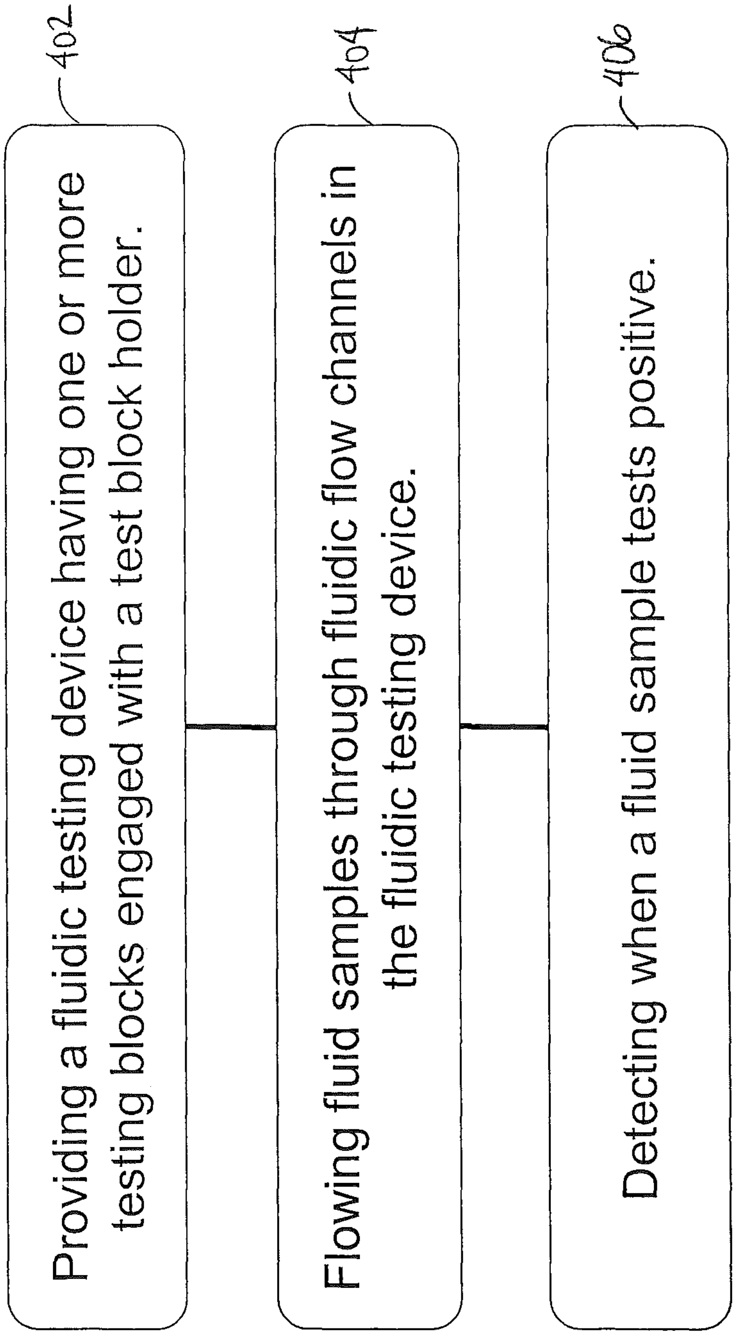
FIG. 14 is a flow chart depicting a method of analyzing multiple samples exposed to multiple analytical sites in a fluidic testing device according to embodiments of the present invention.

FIG. 14 is a flow chart depicting a method of selectively analyzing one or more samples exposed to multiple analytical sites in a fluidic testing device. The method includes analysis of a single sample through multiple tests, and of analyzing multiple samples. The method includes providing the fluidic testing device (block 402), which may be one of the fluid testing devices discussed above having one or more testing blocks and/or one or more layers of testing blocks, and a test block holder forming fluidic flow channels. A portion of a surface of one or more testing blocks is in fluid communication with one or more of the flow channels, and the testing block surface may include a bioactive agent or material that contacts a sample flowing thereover. The device may be configured for onsite use, for example at a medical office, veterinary office or field site. Next, multiple fluid samples are introduced to the fluidic flow channels of the testing device (block 404). The testing device can detect when a fluid sample tests positive for a selected element or analyte (block 406). This may be based on the output of the at least one testing block in communication with a respective fluid sample. In one embodiment, an analyzer analyzes signals obtained from the testing device. In some embodiments, a user may remove the testing blocks from the test block holder to read the results. In other embodiments, the user can leave the testing blocks in place and read the results.

Further embodiments of the present invention include a kit comprising various testing blocks configured to test for one or a variety of selected parameters. The testing blocks may be similarly sized, such that they may be used interchangeably in a fluidic testing device. The testing blocks may be packaged in a sterile package, where sterile is defined as meeting industry standards or guidelines for sterility for diagnostic testing.

Figure 15:
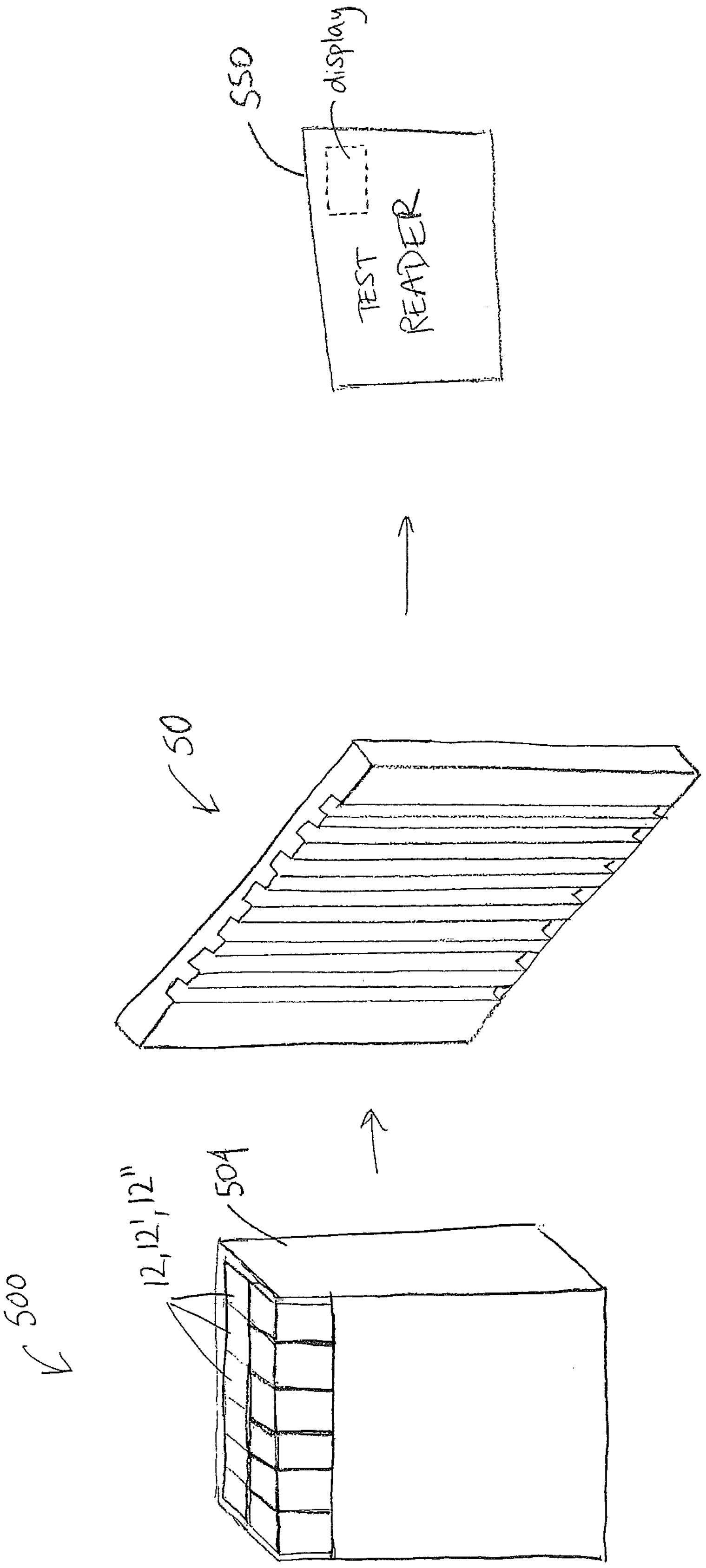
FIG. 15 shows a testing block kit, a test block holder, and a test reader according to embodiments of the present invention.

FIG. 15 shows a testing block kit 500, a test block holder 50, and a test reader 550 according to embodiments of the present invention. The testing block kit 500 includes testing blocks 12, 12', 12", and a sterile package 504. The sterile package 504 is shown open, such that the testing blocks 12, 12', 12" may be selectively removed. However, according to some examples, the sterile package 504 may enclose the testing blocks 12, 12', 12" that may be individually sealed within the package 504. The testing blocks 12, 12', 12" may each be configured to test for a different element, or some or all of the testing blocks 12, 12', 12" may be configured to test for the same element. The testing blocks 12, 12', 12" are configured to engage with the test block holder 50 to form a fluidic testing device, as described above. A user may select ones of the testing blocks 12, 12', 12" to engage with the test block holder 50 according to what one or more elements the user would like the fluidic testing device to test. For example, a user may select a particular testing block or testing blocks 12, 12', 12" to use at a test site (e.g., a lab, hospital, medical office, veterinary office, etc.). In other examples, selected testing blocks 12, 12', 12" may be prepackaged as sets of common diagnostic tests and sold as a set. According to one embodiment, after the fluidic testing device has been exposed to the selected fluid, it is interfaced with a test reader 550. According to various embodiments, the test reader 550 may be an automated or semiautomated analyzer as shown in FIG. 15. The test reader 500 may include a display for presenting the test results.

Figure 16:
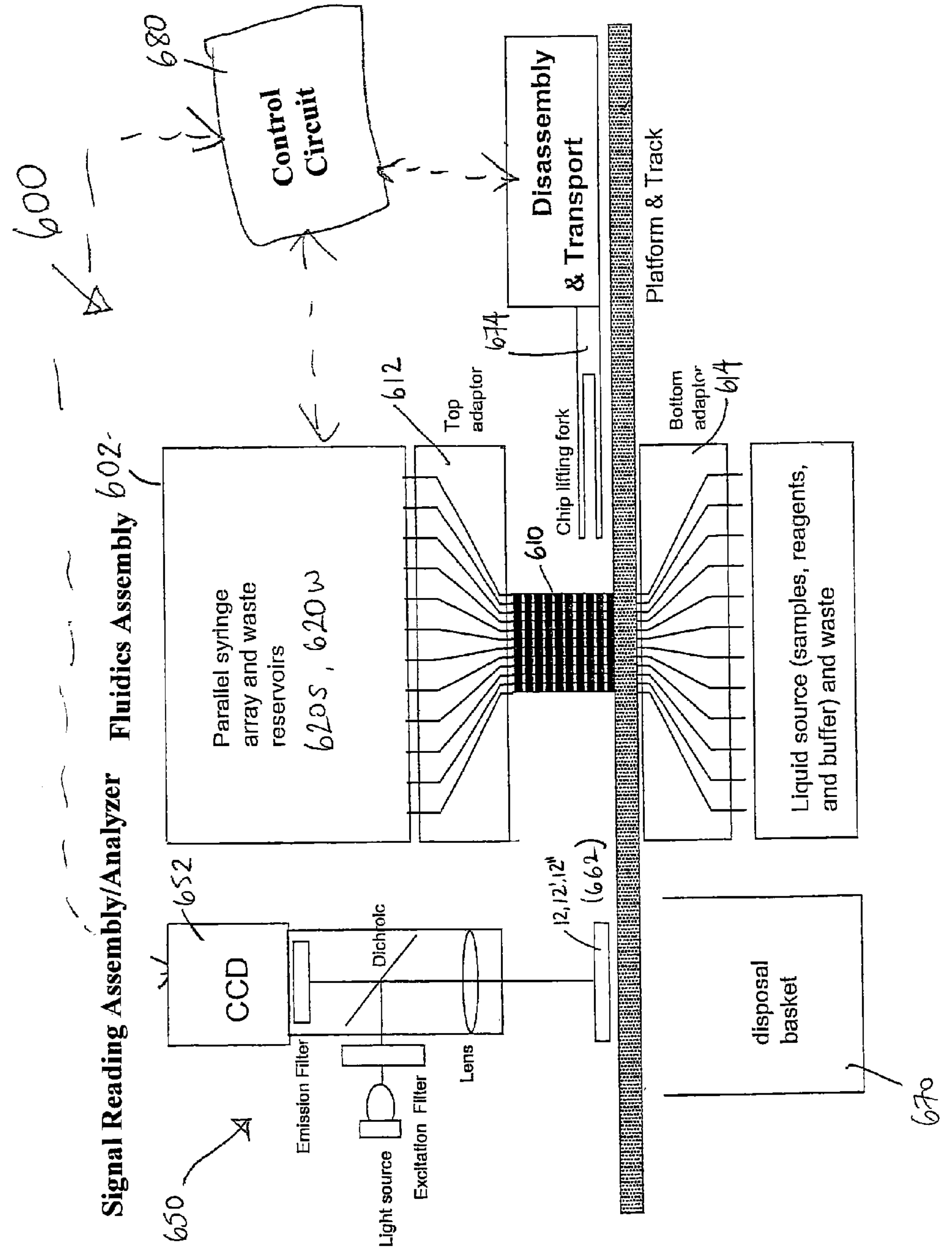
FIG. 16 is a schematic of a test system with testing blocks according to embodiments of the present invention.

FIG. 16 is a schematic illustration showing an automated or semiautomated analyzer 600. As shown, the analyzer 600 includes a fluidics assembly 602, which can sealably engage a side of a fluidic testing device 610, and can cause a fluid sample to flow through the channels (e.g., channels 72, 72' of FIGS. 3C and 3E) of the fluidic testing device. The fluidic testing device includes one or more testing blocks 12, 12', 12" and a test block holder 50, 50', 50", 50'", 50"", 50'"". The fluidics assembly 602 includes a top adaptor 612, which is in fluid communication with the channels of the fluidic testing device 610, and a lower adaptor 614 in fluid communication with the channels of the fluidic testing device 610. According to other embodiments, the fluidic testing device includes the channels of the top 612 and bottom 614 adaptors, and the fluidics assembly 602 couples directly with the fluidic testing device 610. The top adaptor 612 may communicate with a parallel syringe array 620*s* and one or more waste reservoirs 620*w*. The bottom adaptor 614 can have different flow channels that communicate with the entry ports of the fluidic testing device 610 channels. The bottom adaptor 614 can be in fluid communication with the fluid source(s), e.g., samples, reagents, buffers, and/or waste.

The analyzer 600 includes a signal reader or detector 650 at a reading or detection station. The signal reader or detector 650 may include a CCD (charge coupled device) instrument 652 and optic circuits such as filters and lenses that optically communicate with the test surface of a testing block 12, 12', 12" of a fluidic testing device 662. Other signal readers or detectors may be used, such as, but not limited, to optic image recognition systems, intensity, luminescence, radioactivity, magnetism, mass, fluorescence, or color detectors and the like (or combinations of different types of signal detectors and readers). The system 600 can include a fluidic testing device waste disposal 670 that collects used testing blocks 12, 12', 12" so that a user can avoid contact therewith. A fluidic testing device holder 674 may obtain and present the fluidic testing device to the reader/detector 650. The signal reader 650 may include an analyzer that analyzes the signal of the different test sites or the analyzer may be remote. The analyzer may include a programmatic library of signals (not shown) that correlate detected signals to a positive or negative condition for each test. The fluidic testing device 662 and/or testing blocks 12, 12', 12" and reader 650 may cooperate to electronically correlate a sample and a test to the location of the particular test site on the testing block 12, 12', 12" and the test type based on the material and/or sample.

The signal reader 650 may selectively engage all or select ones of the analytical sites of a testing block 12, 12', 12" of the fluidic testing device 662 and detect and/or obtain a signal from the analytical site. The signal reader 650 may be in communication with a control circuit 680 configured to direct automated operation of the analyzer 600 to serially obtain one testing block 12, 12', 12" and present the obtained testing block to the signal reader 650 and analyze the obtained signal. In embodiments in which one or more than one testing block 12, 12', 12" of the fluidic testing device 610 comprises predetermined optically and/or electronically readable indicia as described herein, the control circuit 680 of the analyzer 600 may include a controller that is configured to direct the signal reader 650 to obtain a signal from the region(s) of the testing block 12, 12', 12" comprising such indicia.

The testing blocks 12, 12', 12" may be releasably attached in the test block holder of the fluidic testing device 662 so that one or more testing blocks 12, 12', 12" may be removed from the fluidic testing device 662 separately, sequentially, or in any order or combination.

Figure 17A:
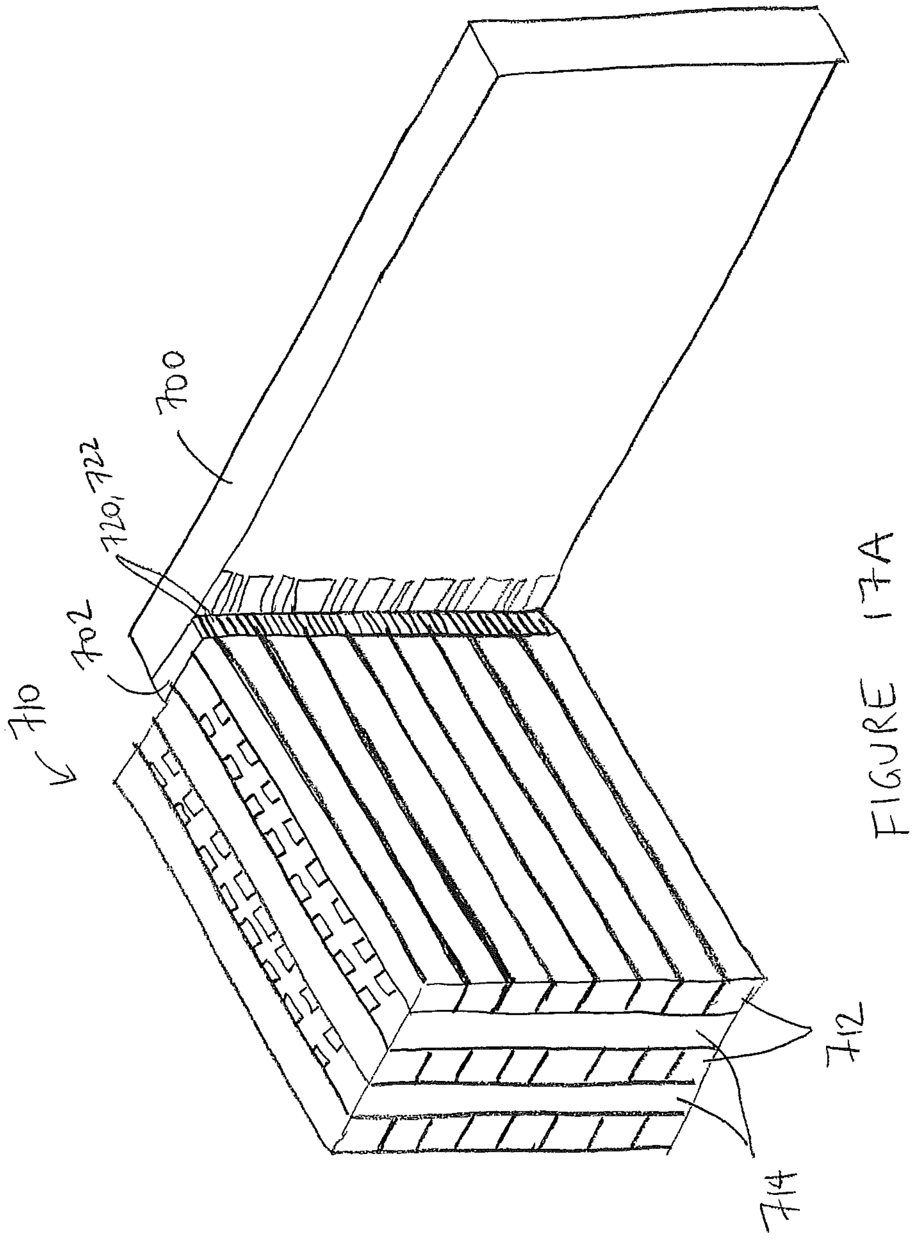
FIG. 17A is an isometric view of an electrical circuit interface that may be used to communicate with fluidic testing device sensors associated with testing blocks according to embodiments of the present invention.
Figure 17B:
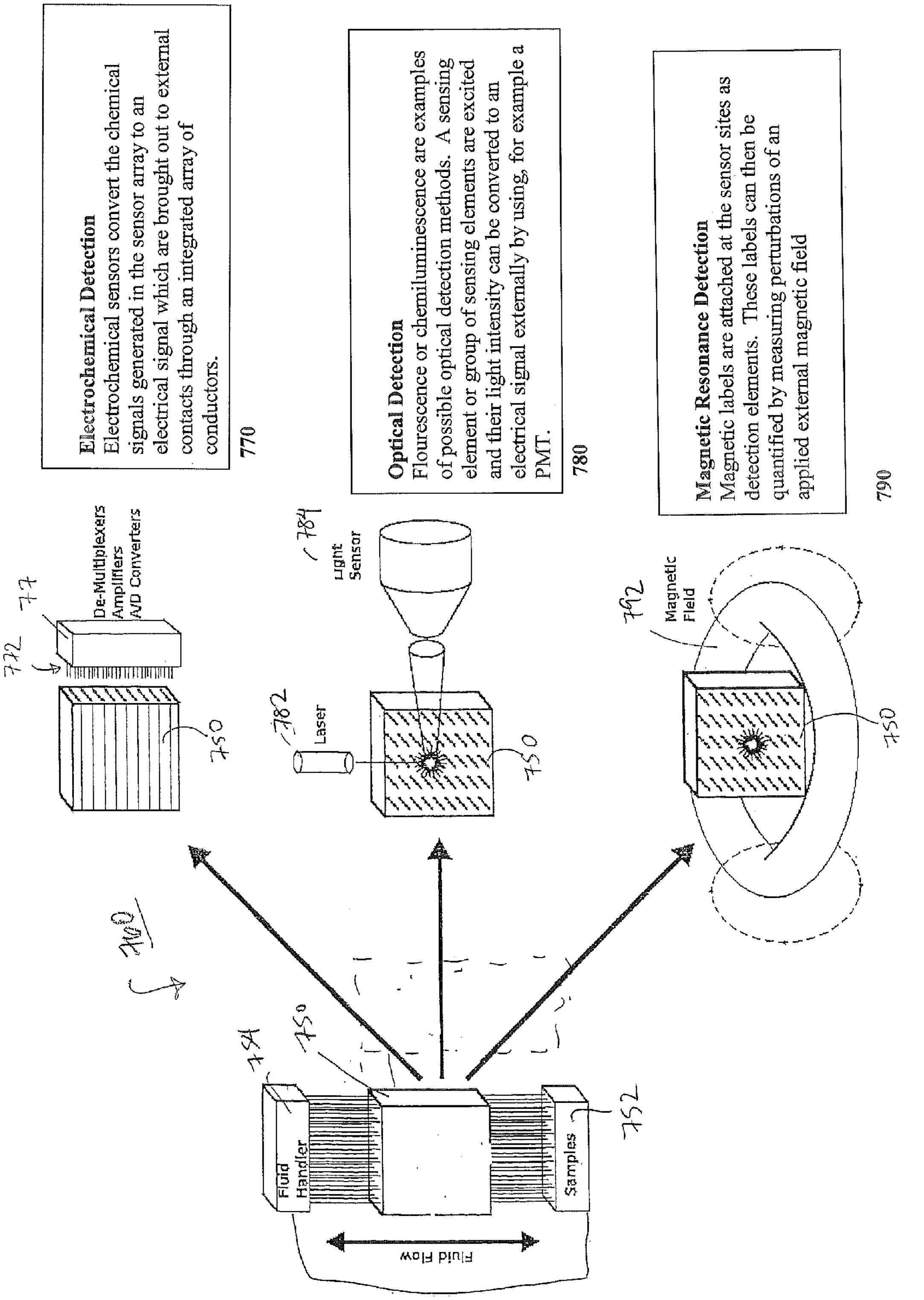
FIG. 17B is a schematic illustration of three exemplary detector systems that can be used to interface with and/or detect the test data of a fluidic testing device according to embodiments of the present invention.

FIG. 17A illustrates an electronic interface 700 that can provide the electrical circuit 702 to connect to a testing block 12, 12', 12'" comprising electrodes, as discussed above with respect to FIG. 4. The fluidic testing block 710 includes testing blocks 12, 12', 12'" and grooved test block holders 714. The interface 700 may include a polymer or other suitable case sandwiching alternating conductive/non-conductive layers 720, 722 extending between the fluidic testing device 710 and the contacts on the interface (e.g., PCB) and in communication with the various electrode layers associated with each testing block sensor in each channel FIG. 17B schematically illustrates a fluidic testing device 750 in communication with fluid samples 752, and a fluid handling assembly 754 that may communicate with different exemplary sensor detectors 760 that may each communicate with the fluidic testing device 750 and may extract test data therefrom. The fluidics assembly 754 can be configured to releasably hold fluidic testing devices 750 of various heights; as such they may vary in use depending on the number of testing blocks and/or the number of testing block sets that are used test-to-test or user-to-user. As shown, in some embodiments, the fluidics assembly 754 resides in fluid communication with one or more of the flow channels at an upper surface of the fluidic testing device 750. Other fluid delivery/flow systems and configurations may also be used.

One exemplary detector 760 is an electrochemical detector 770. The electrochemical detector 770 reads electrochemical signals generated by the testing block sensors in the fluidic testing block 750. The sensors convert chemical signals to electrical signals and those signals are relayed or transmitted to external electrical contacts using an interface 772 with an array of conductors. The electrochemical detector 770 may include de-multiplexers, amplifiers and A/D converters, filters and the like, as is known to those of skill in the art.

Another exemplary detector 760 is an optical detector 780 that comprises a light source, such as a laser 782, that can transmit a light into a sensor space to interrogate the sensors, and a light sensor 784 in communication with the fluidic testing device 750 and laser 782 to be able to receive transmitted light in response thereto. In this embodiment, the sensors of the fluidic testing device 750 are configured to optically change in opacity, color, intensity, transmissiveness, or the like, which can be optically detected. For example, sensors having fluorescent or chemiluminescent properties are examples of optical sensors. A sensing element or group of elements (e.g., working electrode) can be illuminated or excited and their light intensity can be converted to an electrical signal externally by using, for example, a PMT (photomultiplier tube). The detector 780 can include mirrors, lenses and other optical components suitable for optical detection as is known to those of skill in the art.

FIG. 17B also illustrates a third type of detector 760, a magnetic resonance detector 790. In this embodiment, magnetic labels may be attached to the sensor sites as detection probes or elements. These magnetic labels may be quantified or assessed by measuring perturbations of an applied external magnetic field 792 that extends proximate to the fluidic testing device 750.

Non-limiting examples of a bioactive agent or material of this invention include an antibody, an antigen, a nucleic acid, a peptide nucleic acid, a ligand, a receptor, avidin, streptavidin, biotin, Protein A, Protein G, Protein L, a substrate for an enzyme, an anti-antibody, a toxin, a peptide, an oligonucleotide and any combination thereof.

The bioactive agent or material may be attached directly to the testing block, (e.g., a surface of the testing block) and/or the bioactive agent or material may be attached indirectly (i.e., via a linker such as PEG (polyethylene glycol), EDC (N-3-Dimethylaminopropyl-N'-ethylcarbodiimide hydrochloride), glutaraldehyde, etc.). The bioactive agent may also be attached through a mediate layer of biotin, avidin, polylysine, BSA (bovine serum albumin), etc. as is known in the art. The bioactive agent or material of this invention may also be provided to an analytical site in a fluid solution, e.g., in order to detect a reaction at the analytical site.

In some embodiments, the bioactive material can be an antibody or antibody fragment and a signal is detected if an antigen/antibody complex is formed. In such embodiments, as an example, a first antibody or antibody fragment can be attached directly or indirectly to a surface of the fluidic testing device via any variety of attachment protocols standard in the art. Then a fluid test sample is passed through a microfluidic flow channel such that the sample contacts an analytical site that comprises the immobilized first antibody or antibody fragment. If there is an antigen in the test sample that is specific for the immobilized first antibody or antibody fragment, the antigen will be bound (i.e., "captured") by the immobilized first antibody or antibody fragment, resulting in the formation of an antigen/antibody complex immobilized on the fluidic testing device. A fluid comprising a second antibody or antibody fragment that is detectably labeled is then passed through the microfluidic flow channel. The detectably labeled second antibody or antibody fragment is also specific for the antigen bound by the first immobilized antibody and will therefore bind to the captured antigen, thereby immobilizing the detectably labeled second antibody or antibody fragment at the analytical site. Upon subsequent analysis, the immobilized detectably labeled second antibody is detected at the analytical site according to the methods described herein and as are well known in the art for such detection. The result of the analytical testing is that the test sample comprises (e.g., is positive for) the target antigen.

In some embodiments, the bioactive material can be an antigen and a signal is detected if an antigen/antibody complex is formed. In such embodiments, as an example, an antigen (e.g., a peptide, polypeptide, amino acid sequence defining an epitope, etc.) is attached directly or indirectly to a surface of the fluidic testing device(s) via any variety of attachment protocols standard in the art. Then a fluid test sample is passed through a microfluidic flow channel such that the sample contacts an analytical site that comprises the immobilized antigen. If there is an antibody in the test sample that is specific for the immobilized antigen, the antibody in the sample will be bound (i.e., "captured") by the immobilized antigen, resulting in formation of an antigen/antibody complex immobilized on the fluidic testing device. A fluid comprising a detectably labeled anti-antibody or antibody fragment specific for an antibody of the species from which the test sample was obtained is then passed through the microfluidic flow channel. The detectably labeled antibody or antibody fragment will bind the immobilized antibody captured by the antigen, thereby immobilizing the detectably labeled antibody or antibody fragment at the analytical site. Upon analysis, the immobilized detectably labeled antibody is detected at the analytical site according to the methods described herein and as are well known in the art for such detection. The result of the analytical testing is that the test sample comprises (e.g., is positive for) the target antibody.

In other embodiments, the bioactive material can be a nucleic acid or peptide nucleic acid and a signal is detected if a nucleic acid hybridization complex is formed. In such embodiments, as an example, a nucleic acid (e.g., an oligonucleotide) or peptide nucleic acid (PNA) is attached directly or indirectly to a surface of the sensor(s) via any variety of attachment protocols standard in the art. Then a fluid test sample is passed through a microfluidic flow channel such that the sample contacts an analytical site that comprises the immobilized nucleic acid or PNA. If there is a nucleic acid in the test sample that is complementary [either fully complementary or of sufficient partial complementarity to form a hybridization complex under the conditions of the assay (e.g., high stringency, medium stringency or low stringency as such terms are known in the art)], the nucleic acid in the sample will hybridize to (i.e., "be captured by") the immobilized nucleic acid or PNA, resulting in formation of a hybridization complex immobilized on the fluidic testing device. Upon (subsequent) analysis, the immobilized hybridization complex is detected at the analytical site according to the methods described herein and as are well known in the art for such detection. The result of the analytical testing is that the test sample comprises (e.g., is positive for) the target nucleic acid. In some embodiments, the immobilized hybridization complex can be detected because the nucleic acid in the test sample has been modified to comprise a detectable signal (e.g., fluorescence, chemiluminescence, radioactivity, electrochemical detection, enzymatic detection, magnetic detection, mass spectroscopy etc.).

In one example, a pediatric or urgent care center may order single-use testing blocks 12, 12', 12" for use with an onsite test reader. The test block holder 50, 50', 50", 50'", 50"", 50'"" may be reusable or single use disposable. A patient presents with a symptom, and the doctor selects a testing block 12, 12', 12" for diagnosing a condition (e.g., strep throat, bacterial infection, etc.). The doctor obtains a test sample from the patient and exposes the testing block(s) 12, 12', 12" to the test sample. The doctor uses the onsite test reader to analyze the testing block 12, 12', 12" and make a diagnosis.

In a similar example, a veterinary office may order single-use testing blocks 12, 12', 12" for use with an onsite test reader. When an animal presents with a symptom, the vet selects one or more testing blocks 12, 12', 12" for diagnosing the suspected condition. The vet obtains a test sample from the animal and exposes the testing block(s) 12, 12', 12" to the test sample. The vet exposes the testing block(s) 12, 12', 12" to the sample and uses the test reader to evaluate the results and make a diagnosis.

The examples set forth above describing various assays that can be carried out in the fluidic testing device of this invention are not intended to be limiting in any way. If a target analyte can be captured by a corresponding bioactive agent that can be attached to the sensor, and the analyte can be detected by one of the detection methods listed above or other methods, then the assay can be performed using the fluidic testing devices according to embodiments of this invention. The fluidic testing devices can be employed to carry out any type of direct immunoassay, indirect immunoassay, competitive binding assay, neutralization assay, diagnostic assay, and/or biochemical assay. For example, a prenatal and/or neonatal TORCH assay, antigens and/or antibodies specific to toxoplasmosis, rubella, cytomegalovirus and herpes simplex virus can be attached on the sensors for capturing both IgG and IgM antibodies and/or viral antigens corresponding to the pathogens in human serum. As another example, antibodies and/or antigens specific to human Hepatitis B and C can be attached for detecting antibodies specific to surface and core antigens of the virus and/or the antigens in human serum samples. Another example, a substrate is immobilized on the fluidic testing device and a fluid sample is passed over the immobilized substrate to detect an enzyme that specifically acts on the immobilized substrate. A product of such enzyme activity can be detected, resulting in the identification of a test sample positive for the target enzyme.

Non-limiting examples of pathogens, agents of interest and/or contaminants that can be detected, identified and/or quantitated according to methods and devices of embodiments of the inventions include a majority of pathogens causing infectious diseases in human and animal, food and air borne pathogens, and pathogens which can be used as bioterrorism agents. The fluidic testing devices can also be used to detect antibodies and proteins which can be used to diagnose a majority of infectious diseases and other diseases and conditions (e.g. thyroid function, pregnancy, cancers, cardiac disorders, autoimmune diseases, allergy, therapeutic drug monitoring, drug abuse tests, etc.). It would be well understood to one of ordinary skill in the art that the methods and fluidic testing devices according to embodiments of this invention can also be employed to detect, identify and/or quantitate specific nucleic acids in a sample (e.g., mutations such as insertions, deletions, substitutions, rearrangements, etc., as well as allelic variants (e.g., single nucleotide polymorphisms). Nucleic acid based assays of embodiments of this invention can also be employed as diagnostics (e.g., to detect nucleic acid of a pathogen in a sample). In some embodiments, mutations of cytochrome P450 genes and blood clotting factor genes can be detected and/or identified. The fluidic testing devices of embodiments of this invention can also be used to determine the level of a RNA transcript by hybridizing a labeled complex mixture of RNA samples onto surfaces coated with complementary strands of oligonucleotides or cDNAc. In other embodiments, the fluidic testing devices of the present invention may be used to complete a TORCH panel test, to detect mutations, or to complete veterinary panels.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A fluidic testing device, comprising:

a test block holder; and at least one testing block having a test surface, wherein the test block holder engages the at least one testing block to form at least one fluidic flow channel in fluid communication with the test surface, wherein the test block holder includes at least one groove, and wherein a respective testing block attaches to a respective groove so that the test surface faces, but is spaced apart from a wall of the groove to define a respective fluidic flow channel therebetween.

2. A device according to claim 1, wherein the at least one testing block is a plurality of testing blocks including a first testing block and a second testing block that are slidably releasably attached to the test block holder.

3. A device according to claim 2, wherein the first and second testing blocks reside side by side in the test block holder.

4. A device according to claim 1, wherein the at least one testing block includes n testing blocks, and wherein 1<n<1,000.

5. A device according to claim 1, wherein the at least one fluidic flow channel comprises a microfluidic flow channel.

6. A device according to claim 1, wherein the at least one testing block defines an electrode set alone or in combination with the test block holder.

7. A device according to claim 6, wherein the electrode set includes at least one working electrode, a reference electrode and a counter electrode, with each electrode in the electrode set positioned one above another and isolated by an electrical insulator therebetween.

8. A device according to claim 1, wherein the testing block defines a biochip.

9. A device according to claim 1, wherein the at least one fluidic flow channel is a plurality of separate, spaced apart fluidic flow channels, and wherein the at least one testing block is substantially rectangular, wherein the at least one groove is a plurality of rectangular grooves that are spaced apart and substantially coplanar, and wherein each rectangular groove is configured to slidably receive one testing block to hold the testing blocks over but spaced apart from a wall of the rectangular grooves to form the fluidic flow channels.

10. A device according to claim 1, wherein the at least one fluid flow channel is a plurality of channels, wherein at least a first portion of the test surface comprises a predetermined material analyte for contacting a sample flowing through at least one of the channels.

11. A device according to claim 10, wherein the predetermined material comprises a bioactive material of one or more of the following: an antibody, an antigen, a nucleic acid, a peptide nucleic acid, a ligand, a receptor, avidin, biotin, Protein A, Protein G, Protein L, a substrate for an enzyme and any combination thereof.

12. A device according to claim 10, wherein a second portion of the test surface comprises a different predetermined material analyte for contacting a sample flowing through the channels.

13. A system according to claim 1, wherein the at least one fluid flow channel is a plurality of fluidic flow channels and the at least one testing block is a plurality of testing blocks which reside orthogonal to the fluidic flow channels.

14. A system according to claim 1, wherein the at least one fluid flow channel is a plurality of fluidic flow channels and the at least one testing block is a plurality of testing blocks which reside parallel to the fluidic flow channels.

15. A system for testing fluid samples comprising:

a test block holder wherein the test block holder includes spaced apart parallel grooves;

a plurality of user-selectable testing blocks, attachable to the test block holder by a user, and wherein each test block is configured to slidably engage or press-fit with a respective groove of the test block holder and is held spaced apart from a wall of a corresponding groove to define a respective fluidic flow channel between the test block and the wall of the groove; and a portable reader for coupling to the testing blocks to detect whether a fluid sample tests positive for a selected parameter based on an output or response of at least one of the plurality of testing blocks.

16. A system according to claim 15, wherein a respective block reside orthogonal to a corresponding fluidic flow channel.

17. A system according to claim 15, wherein a respective block reside parallel to a corresponding fluidic flow channel.

18. A system according to claim 15, wherein the testing blocks are configured to test for water-borne hazards or toxins.

19. A system according to claim 15, wherein the testing blocks are configured to test for air-borne hazards.

20. A system according to claim 15, wherein the testing blocks are configured to carry out medical diagnostic tests on biosamples.

21. A system according to claim 15, wherein the testing blocks are rectangular, wherein the testing block holder has correspondingly-shaped rectangular grooves, the grooves being spaced apart and coplanar, and wherein each rectangular groove is configured to slidably receive one testing block to hold the testing block over but spaced apart from an inner wall of the rectangular groove.

* * * * *

UNITED STATES PATENT AND TRADEMARK OFFICE

CERTIFICATE OF CORRECTION

PATENT NO. : 9,199,239 B2
APPLICATION NO. : 13/407163
DATED : December 1, 2015
INVENTOR(S) : Liu et al.

It is certified that error appears in the above-identified patent and that said Letters Patent is hereby corrected as shown below:

<u>In the Specification:</u>
Column 6, Line 53: Please correct “1 ml” to read -- 1 μl --
Column 14, Line 4: Please correct “channels 220, 220□, 220″, 220″ over time.”
to read -- channels 220, 220□, 220″, 220□″ over time. --
Column 14, Line 18: Please correct “50″ to form” to read -- 50″″ to form --

<u>In the Claims</u>:
Column 23, Claim 16, Line 8: Please correct “reside” to read -- resides --
Column 23, Claim 17, Line 11: Please correct “reside” to read -- resides --

Signed and Sealed this
Thirty-first Day of May, 2016

Michelle K. Lee
*Director of the United States Patent and Trademark Office*